(12) United States Patent
Frett et al.

(10) Patent No.: US 9,210,230 B2
(45) Date of Patent: Dec. 8, 2015

(54) SYSTEMS, METHODS, AND APPARATUS TO MONITOR MEDIA PRESENTATIONS

(71) Applicants: Kenneth J. Frett, Tampa, FL (US); Jan Besehanic, Tampa, FL (US)

(72) Inventors: Kenneth J. Frett, Tampa, FL (US); Jan Besehanic, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 14/141,400

(22) Filed: Dec. 26, 2013

(65) Prior Publication Data

US 2014/0189108 A1 Jul. 3, 2014

Related U.S. Application Data

(63) Continuation of application No. 13/473,319, filed on May 16, 2012, now Pat. No. 8,700,657.

(51) Int. Cl.
| | |
|---|---|
| *G06Q 30/02* | (2012.01) |
| *H04L 29/08* | (2006.01) |
| *H04H 60/64* | (2008.01) |
| *H04H 60/66* | (2008.01) |
| *H04H 60/37* | (2008.01) |
| *H04H 60/40* | (2008.01) |
| *H04H 60/44* | (2008.01) |

(52) U.S. Cl.
CPC ............... *H04L 67/22* (2013.01); *G06Q 30/02* (2013.01); *G06Q 30/0241* (2013.01); *H04H 60/64* (2013.01); *H04H 60/66* (2013.01); *H04H 60/37* (2013.01); *H04H 60/40* (2013.01); *H04H 60/44* (2013.01); *H04H 2201/50* (2013.01); *H04H 2201/90* (2013.01)

(58) Field of Classification Search
CPC .......................... G06Q 30/02; G06Q 30/0241
USPC ........................................................ 705/7.29
See application file for complete search history.

(56) References Cited

U.S. PATENT DOCUMENTS

| | | | |
|---|---|---|---|
| 6,182,068 B1 * | 1/2001 | Culliss ........................ 707/721 |
| 6,728,767 B1 | 4/2004 | Day et al. | |
| 6,976,090 B2 | 12/2005 | Ben-Shaul et al. | |

(Continued)

OTHER PUBLICATIONS

"Debug Logging for DNS in Windows Server 2003", accessed on Feb. 15, 2011, http://web.archive.org/web/20071013132927/www.computerperformance.co.uk/w2k3/services/DNS_debug_logging.htm (3 pages).

(Continued)

*Primary Examiner* — Thu-Nguyet Le
(74) *Attorney, Agent, or Firm* — Hanley, Flight & Zimmerman, LLC

(57) ABSTRACT

Systems, methods and apparatus to monitor media presentations are disclosed. An example method includes identifying a household of panelists based on a public Internet Protocol address identified in tagging data transmitted by a media presentation device. A panelist is identified within the household of panelists based on metering data. A media source is identified based on the tagging data. Identification of the media presented in association with the tagging data based on at least one of the tagging data and the metering data is attempted. The panelist is credited with exposure to the identified media from the media source at a media presentation location associated with the public IP address when the media is identified. The panelist is credited with exposure to media from the media source at the media presentation location when the media is not identified.

20 Claims, 14 Drawing Sheets

(56) References Cited

U.S. PATENT DOCUMENTS

| | | |
|---|---|---|
| 7,606,897 B2 | 10/2009 | Izrailevsky et al. |
| 7,756,984 B2 | 7/2010 | Burr et al. |
| 7,853,721 B2 | 12/2010 | Awadallah et al. |
| 8,700,657 B2 | 4/2014 | Frett et al. |
| 2005/0117514 A1 | 6/2005 | Iwata et al. |
| 2007/0067419 A1 | 3/2007 | Bennett |
| 2007/0283028 A1 | 12/2007 | Gilroy et al. |
| 2007/0294419 A1 | 12/2007 | Ulevitch |
| 2010/0121954 A1 | 5/2010 | Yang et al. |
| 2010/0191723 A1* | 7/2010 | Perez et al. .................. 707/723 |
| 2011/0055349 A1 | 3/2011 | Awadallah et al. |
| 2012/0254996 A1 | 10/2012 | Wilbourn et al. |
| 2013/0159499 A1 | 6/2013 | Besehanic |
| 2013/0311478 A1 | 11/2013 | Frett et al. |

OTHER PUBLICATIONS

"DNS Monitor", YellowHead.com, accessed on Feb. 15, 2011, http://www.yellowhead.com/DNS_Monitor.htm, (7 pages).

Microsoft, "Managing DNS Server Configuration and Security", accessed on Jan. 12, 2011, http://technet.microsoft.com/en-us/library/bb727020(printer).aspx, (6 pages).

"Open DNS", accessed on Jan. 12, 2011, http://www.opendns.com/solutions/overview/, (3 pages).

United States Patent and Trademark Office, "Notice of Allowance", issued in connection with corresponding U.S. Appl. No. 13/473,319 dated Aug. 29, 2013 (10 pages).

United States Patent and Trademark Office, "Notice of Allowance", issued in connection with corresponding U.S. Appl. No. 13/473,319 dated Nov. 22, 2013 (9 pages).

* cited by examiner

500

| REQUESTING IP ADDRESS | QUERY PROCESSOR | PROVIDER DOMAIN | TIMESTMAP |
|---|---|---|---|
| 510 → 209.173.241.209 _305_ | QUERY PROCESSOR 1 _230_ | NETFLIX.COM _550_ | 7:00PM _512_ |
| 520 → 209.173.241.209 _320_ | QUERY PROCESSOR 2 _232_ | HULU.COM _555_ | 9:30PM _522_ |
| 530 → 138.108.20.122 _320_ | QUERY PROCESSOR 1 _230_ | HULU.COM _555_ | 10:30PM _532_ |

| PANELIST | MEDIA PRESENTATION DEVICE | PROVIDER DOMAIN | TIMESTMAP |
|---|---|---|---|
| 610 → PANELIST 1 _310_ | INETERNET TELEVISION _420_ | NETFLIX.COM _550_ | 7:00PM _512_ |
| 620 → PANELIST 1 _310_ | GAMING CONSOLE _425_ | HULU.COM _555_ | 9:30PM _522_ |
| 630 → PANELIST 2 _325_ | INTERNET TELEVISION _430_ | HULU.COM _555_ | 10:30PM _532_ |

FIG. 6

700

| PANELIST | TIMESTAMP | EVENT | DATA | MEDIA PRESENTATION DEVICE |
|---|---|---|---|---|
| 705→ PANELIST 1 310 | 7:00PM 770 | 771 MEDIA START | N/A | INTERNET TELEVISION 420 |
| 710→ PANELIST 1 310 | 7:03PM 775 | 776 MEDIA IDENTIFIED | TELEVISION SHOW A 777 | INTERNET TELEVISION 420 |
| 715→ PANELIST 1 310 | 8:00PM 780 | 781 MEDIA STOP | N/A | INTERNET TELEVISION 420 |
| 720→ PANELIST 1 310 | 9:30PM 785 | MEDIA START 786 | N/A | GAMING CONSOLE 425 |
| 725→ PANELIST 1 310 | 10:00PM 790 | MEDIA STOP 791 | N/A | GAMING CONSOLE 425 |
| 730→ PANELIST 2 325 | 10:30PM 795 | MEDIA START 796 | N/A | INTERNET TELEVISION 430 |
| 735→ PANELIST 2 325 | 11:30PM 797 | MEDIA STOP 798 | N/A | INTERNET TELEVISION 430 |

| PANELIST | TIMESTAMP | DATA | PROVIDER DOMAIN | MEDIA PRESENTATION DEVICE |
|---|---|---|---|---|
| PANELIST 1 310 | 7:03PM 775 | TELEVISION SHOW A 777 | 550 NETFLIX.COM | INTERNET TELEVISION 420 |
| PANELIST 1 310 | 9:31PM 820 | TELEVISION SHOW B 830 | 555 HULU.COM | GAMING CONSOLE 425 |
| PANELIST 2 325 | 10:30PM 785 | | 555 HULU.COM | INTERNET TELEVISION 430 |

1005 → (row 1)
1010 → (row 2)
1015 → (row 3)

FIG. 10

SYSTEMS, METHODS, AND APPARATUS TO MONITOR MEDIA PRESENTATIONS

RELATED APPLICATION

This patent arises from a continuation of U.S. patent application Ser. No. 13/473,319, which was filed on May 16, 2012. U.S. patent application Ser. No. 13/473,319 is hereby incorporated herein by reference in its entirety.

FIELD OF THE DISCLOSURE

This disclosure relates generally to monitoring media presentations, and, more particularly, to systems, methods, and apparatus to monitor media presentations.

BACKGROUND

Media providers and/or metering entities such as, for example, advertising companies, broadcast networks, etc. are often interested in the viewing, listening, and/or media behavior of audience members and/or the public in general. To collect these behaviors and/or interests, an audience measurement company may enlist panelists (e.g., persons agreeing to have their media exposure habits monitored) to cooperate in an audience measurement study. The viewing behavior of these panelists as well as demographic data about the panelists is collected and used to statistically determine (e.g., project, estimate, etc.) the size and demographics of a larger viewing audience.

In recent years, increasing numbers of consumer devices have been provided with Internet connectivity and the ability to retrieve media from the Internet. In some cases, these consumer devices enable reporting of metering data to metering entities.

BRIEF DESCRIPTION OF THE DRAWINGS

FIG. 5 is an example data table representing records of Domain Name Service (DNS) queries originating from the IP address of FIG. 3 and received by the query processors of FIG. 2.

FIG. 6 is an example data view representing an association of the panelist of FIG. 3, the media presentation devices of FIGS. 1 and/or 4, and the DNS records of FIG. 5.

FIG. 7 is an example data table representing metering data received from the meter of FIG. 1.

FIG. 10 is an example data view representing an association of the panelist of FIG. 3 with the tagging data of FIG. 8, the metering data of FIG. 7, the DNS records of FIG. 5, and the media presentation device of FIG. 4.

DETAILED DESCRIPTION

Figure 1:
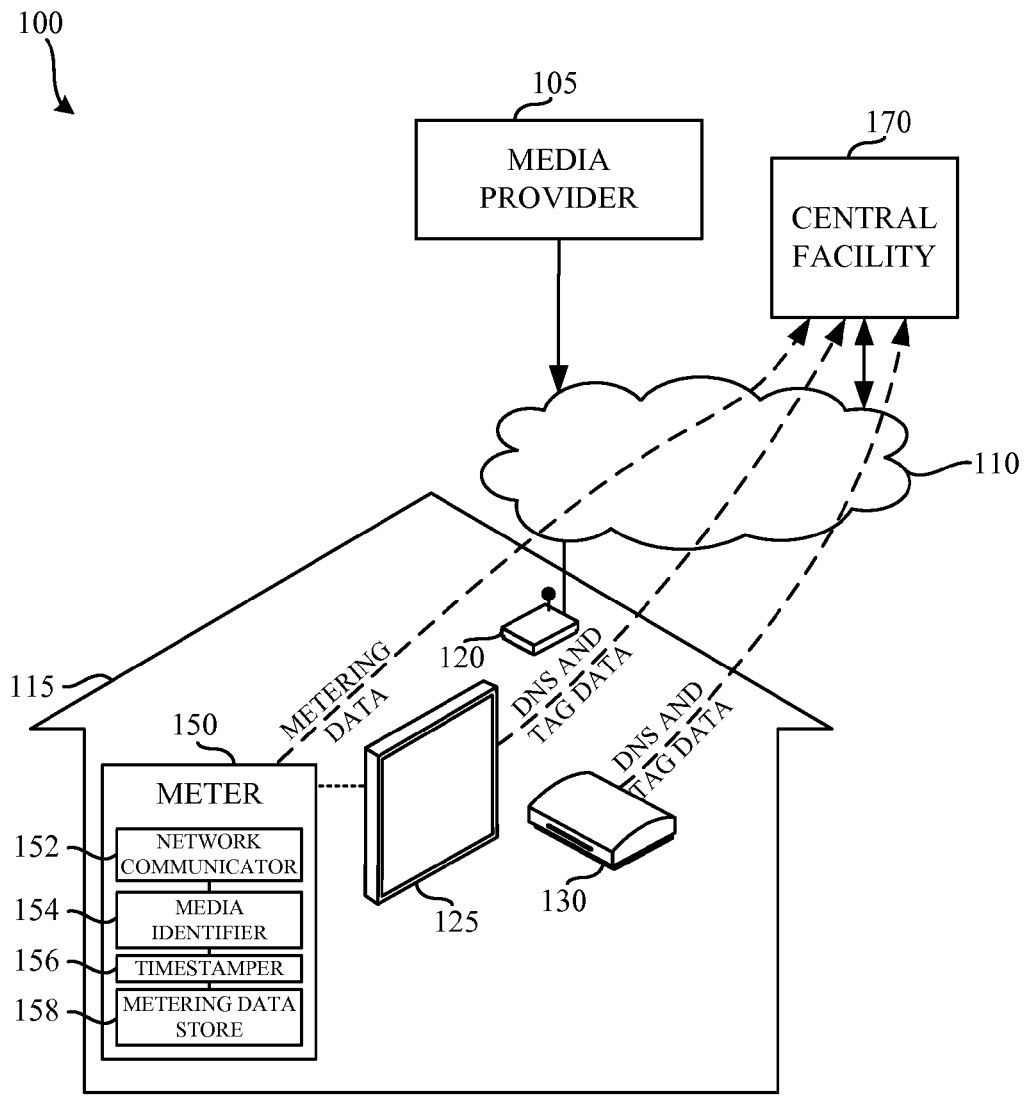
FIG. 1 is a block diagram of an example system to monitor media presentations.

As used herein, the term "media" includes any type of content and/or advertisement, including television programming, radio, movies, web sites, etc. Example methods, apparatus, and articles of manufacture disclosed herein identify media presentation devices and/or types of media presentation devices used for media measurement. Such media presentation devices may include, for example, Internet-enabled televisions, personal computers, Internet-enabled mobile handsets (e.g., a smartphone, an iPod®, etc.), video game consoles (e.g., Xbox®, PlayStation® 3, etc.), tablet computers (e.g., an iPad®, a Motorola™ Xoom™, etc.), digital media players (e.g., a Roku® media player, a Slingbox®, a Tivo®, etc.), etc. In some examples, identifications of media presentation devices used in consumer locations (e.g., homes, offices, etc.) are aggregated to determine ownership and/or usage statistics of available media presentation devices, relative rankings of usage and/or ownership of media presentation devices, type(s) of uses of media presentation devices (e.g., whether a device is used for browsing the Internet, streaming media from the Internet, etc.), and/or other type(s) of media presentation device information.

In some disclosed examples, a media presentation device includes a network interface to transmit a request for media to be presented by the media presentation device. In such examples, the media presentation device requests media from a media provider via a connected network (e.g., the Internet). In some examples, the request for media is a HyperText Transfer Protocol (HTTP) request, a Session Initiation Protocol (SIP) message, a domain name service (DNS) query, a file transfer protocol (FTP) request, and/or any other type(s) of request.

Media monitoring entities collect audience measurement data using a number of different systems and/or methods. In some examples, audience measurement data is collected using Domain Name Service (DNS) query information by, for example, in manners similar to those disclosed in Besehanic, et al. U.S. application Ser. No. 13/329,044 filed on Dec. 16, 2011, which is hereby incorporated herein by reference. Monitoring DNS query information enables the audience measurement entity to identify a media provider (e.g., a media providing service such as, Hulu®, Netflix®, Pandora®, Spotify®, iHeartRadio™, etc.), a media presentation device used to present the media (e.g., an Internet enabled television, a gaming console, a personal computer, etc.), a time that the media presentation device requested the IP address of the media provider, etc. However, DNS query information does not identify the particular media that is presented.

In some examples, the audience measurement data is collected using a metering device (e.g., a set top box) installed at a location of a panelist (e.g., a panelist's home). The example metering device collects metering information based on what is being presented in the vicinity of the metering device. In some examples, the metering device identifies the presented media using codes and/or signatures associated with the presented media. In some examples, the metering information identifies the media presentation device and/or the panelist associated with the media presentation. The metering information may not identify the source of the media (e.g., may not identify a streaming service provider such as, for example, Hulu®, Netflix®, Pandora®, Spotify®, iHeartRadio™, etc.).

In some examples, the audience measurement data is collected using tagging information. Tagging information enables monitoring of media that might not otherwise be identified by the metering device. To gather tagging information, the media presentation device cooperates with the media provider and/or a central facility of the audience measurement entity to send tagging information to the audience measurement entity. In particular, an application of the media presentation device (e.g., a browser, a media presentation application, etc.) detects the presence of a tag associated with the media. In some examples, the tag is implemented by metadata such as, for example, an ID3 tag. However, any other method of tagging media may additionally or alternatively be used such as, for example, an HTML tag such as that disclosed in Blumenau, U.S. Pat. No. 6,108,637, which is incorporated herein by reference. Tagging information identifies the presented media based on the identified tag(s). In some examples the tagging information identifies the media presentation device used to present the media. In some examples, the tagging information identifies the provider of the media. However, not all media presentation devices and/or applications thereof cooperate with the media provider and/or the central facility to provide and/or collect the tagging information.

With respect to monitoring DNS query information, some networks utilize Internet Protocol (IP) for communication. Two schemes used to address network resources in IP networks are: IP addresses and domain names.

The IP address scheme utilizes IP addresses assigned to network devices. For example, a network device might be assigned an IP version 4 (IPv4) address of 192.168.0.2. Any other past, present, and or future addressing scheme may additionally or alternatively be used (e.g., IPV6). In some examples, more than one IP address might be associated with one network device. For example, at a first time, the network device might be identified by an IP address of 192.168.0.2, while at a second time, the network device might be identified by a different IP address of 192.168.0.3.

Internet Service Providers (ISPs) typically provide a single public IP address for each media exposure measurement location (e.g., a media presentation location, a panelist household, an internet café, an office, etc.) receiving Internet services. In some examples, multiple devices (e.g., media presentation devices) are communicatively coupled by a local area network (LAN) at a media exposure measurement location. In some examples, the LAN includes a router and/or gateway that accesses another network (e.g., the Internet) using a single public IP address associated with the media exposure measurement location and then distributed media with in the LAN based on a private addressing scheme.

In some examples, within the LAN, individual media presentation devices are given private IP addresses in accordance with, for example, a dynamic host control protocol (DHCP). When a media presentation device within the LAN transmits a request to a resource outside of the LAN (e.g., on the Internet) the router and/or gateway translates the originating (i.e., private) IP address of the device making the query to the public address of the router and/or gateway before relaying the request outside of the LAN (e.g., to the Internet). Thus, when a resource outside of the LAN receives the request, the resource is able to transmit a return message (e.g., a response) to the LAN. On the return path, the router and/or gateway employs a local look up table to translate the destination IP address of the response received from the resource to the private IP address of the requesting device so that the return message may be delivered to the media presentation device that made the original request.

The second addressing scheme utilizes domain names. Domain names are human readable identifiers that identify a network resource. Example domain names include "Amazon.com", "Google.com", "Nielsen.com", "HFZLaw.com", etc. While an IP address of a network resource might change over time, the domain name typically remains the same. Domain names typically remain the same because they are purchased by the media provider as a way for users to easily identify the service or media provided by the media provider. As the IP address of the media provider changes (e.g., because the media provider is now hosting their service via a different server, etc.), the domain name is updated to be associated with the most recent IP address.

Domain names are accessible via a domain name service (DNS) server. The DNS server includes records that, for example, identify a current IP address associated with a domain name of interest. DNS servers providing DNS services provide for translation between domain names and IP addresses and vice-versa. For example, a domain name of "mysite.com" may translate to an IP address of "38.76.48.143", a domain name of "subdomain1.mysite.com" may translate to "38.76.48.144", and a domain name of "subdomain2.mysite.com" may translate to "43.47.167.134". To access a network resource via a domain name, a network device first requests an IP address associated with the domain name of the network resource from a DNS server. Such a request is sometimes referred to as a DNS query or a DNS lookup. The DNS server provides a response to the DNS query and/or DNS lookup indicating the IP address associated with the requested domain name. The network device can then send a content request via the Internet to the network resource at the received IP address.

In accordance with teachings of this disclosure, one or more DNS servers are used to track DNS queries and/or the devices making such queries. DNS queries are indicative of the identified media presentation devices requesting media from a media provider because requests for media are typically preceded by a DNS query. Therefore, DNS queries may be of interest to a media monitoring company. In some examples, a DNS server stores records of what domain names were queried and the originator of the DNS query. Thus, DNS queries from a particular household for a server and/or resource of a media provider may be indicative of media presentations associated with the corresponding media provider in the particular household.

While a given media exposure measurement location can be identified by the public IP address assigned by the ISP and identified in a DNS query (e.g., via a DNS lookup), individual devices within the media exposure measurement location cannot be identified as easily. In some examples disclosed herein, to identify media presentation devices within the media exposure measurement location, the media presentation devices are each assigned to separate DNS servers. Thus, although requests for media and/or DNS lookups are made from the household using the same public IP address, DNS lookup queries for a first device in the LAN/household are directed to a first DNS server while DNS queries for a second device in the LAN/household are directed to a second, different DNS server. Although both DNS lookups are performed using the same public IP address, the different DNS servers addressed inherently identify which of the devices in the LAN/household are responsible for the DNS query. Thus, in some examples disclosed herein, multiple DNS servers are used to associate media requests with different devices within the media exposure measurement location. In some examples, one DNS server is provided per media presentation device within the media exposure measurement location. Thus, each media presentation device within the media exposure measurement location is associated with a respective different DNS server.

For example, a first device (e.g., an Internet enabled television) is assigned to a first DNS server. The association may be done, for example, by the respective gateway of the LAN which is programmed to send DNS queries from the first device within the LAN to the first DNS server, and DNS queries from a second device to a second DNS server, etc. Additionally or alternatively, the association may be done by the respective gateway of the LAN when DNS settings are communicated to each media presentation device (e.g., during a DHCP procedure). Because the DNS server (or a device analyzing logs of the DNS server) knows that DNS queries from the (public) IP address of the monitored LAN originate with a particular device (e.g., the first device) within the LAN, when the first device transmits a DNS query to the first DNS server, the first DNS server (or the device analyzing the logs of the first DNS server) is able to associate the DNS query with the media exposure measurement location via the public IP address, as well as associate the DNS query with the first device via the media presentation device to DNS server association.

Some example methods, apparatus, and/or articles of manufacture disclosed herein are employed at a media exposure measurement location having multiple media presentation devices. Some of these example methods, apparatus, and/or articles of manufacture are employed at a location interposed between the media presentation devices and a wide area network (WAN), such as the Internet, that includes one or more media providers that provide media in response to request(s) from the media presentation devices. Some example methods, apparatus, and/or articles of manufacture disclosed herein intercept and/or record outgoing messages to the WAN (e.g., requests from media presentation devices on the same LAN as the intercepting method, apparatus, or article of manufacture).

While monitoring DNS information enables identification of the media provider and/or the media presentation device, DNS information typically does not enable identification of the presented media. Thus, metering data (e.g., data identified by a metering device) and/or tagging data (e.g., data used during trackback monitoring) are used to identify media presentations.

In some examples, monitoring media using metering data involves identifying metadata, codes, and/or signatures associated with media being presented. In examples illustrated herein, a meter (e.g., a set top box) is installed at a location of a panelist (e.g., a home). The example meter collects monitoring information based on what is being presented in the vicinity of the meter. In some examples, the meter detects metadata, video, and/or audio signals to identify the media. In some examples, the meter identifies the presented media using codes and/or signatures associated with the presented media. The meter stores (e.g., caches, buffers, etc.) the identified metadata, codes, and/or signatures and transmits the stored information to the audience measurement entity for analysis.

Identification codes, such as watermarks, ancillary codes, etc. may be transmitted with and/or within media signals. Identification codes are data that are transmitted with media (e.g., inserted into the audio, video, or metadata stream of media) to uniquely identify broadcasters and/or media (e.g., content or advertisements), and/or are associated with the media for another purpose such as tuning (e.g., packet identifier headers ("PIDs") used for digital broadcasting). Codes are typically extracted using a decoding operation.

Signatures are a representation of some characteristic of the media signal (e.g., a characteristic of the frequency spectrum of the signal). Signatures can be thought of as fingerprints. They are typically not dependent upon insertion of identification codes in the media, but instead preferably reflect an inherent characteristic of the media and/or the signal transporting the media. Systems to utilize codes and/or signatures for audience measurement are long known. See, for example, Thomas, U.S. Pat. No. 5,481,294, which is hereby incorporated by reference in its entirety.

Using the meter at the location of the panelist enables identification of the media being presented and media events associated therewith (e.g., a start of a media presentation, an end of a media presentation, etc.). However, in some cases, it is difficult for the meter to identify the media presentation device and/or the source of the presented media (e.g., Hulu®, Netflix®, Pandora®, Spotify®, iHeartRadio™, etc.). When combined with DNS monitoring information, it is possible to identify the media presentation device, the media, and the source of the presented media.

In some examples, the meter might not be able to identify media. For example, if a tablet computer (e.g., an iPad®, a Motorola™ Xoom™, etc.) is used to present media, the meter might not detect the presentation of the media. In some examples, the meter might detect the presentation of the media but might not be able to identify the media because, for example, the code and/or signature associated with the media are not intelligible. To compensate for such a scenario, tagging data is additionally or alternatively used to identify what media is presented.

FIG. 1 is a block diagram of an example system 100 to monitor media presentations. Shown in FIG. 1 are a media provider 105, a network 110, a media presentation location 115, and a central facility. The media presentation location 115 includes a network gateway 120, a first media presentation device 125 (e.g., an Internet television), a second media presentation device 130 (e.g., a gaming console), and a meter 150.

The example media provider 105 of the illustrated example of FIG. 1 comprises one or more servers providing Internet media (e.g., web pages, videos, images, etc.). The example media provider 105 may be implemented by any provider(s) of media such as a digital media broadcaster, multicaster, or unicaster (e.g., a cable television service, a fiber-optic television service, an IPTV provider, etc.) and/or an on-demand digital media provider (e.g., an Internet streaming video and/or audio services such as Netflix®, YouTube®, Hulu®, Pandora®, Last.fm®, etc.), a web page, and/or any other provider of media. Additionally or alternatively, the example media provider 105 may not be on the Internet. For example, the media providers may be on a private, a virtual private, and/or semi-private network (e.g., a LAN).

The example network 110 of the illustrated example of FIG. 1 is a wide area network (WAN) such as the Internet. However, in some examples, local networks may additionally or alternatively be used. For example, multiple networks may be utilized to couple the components of the example system 100 to monitor media presentations.

The example media presentation location 115 of the illustrated example of FIG. 1 is a panelist household. However, the media presentation location 115 may be any other location, such as, for example an internet café, an office, an airport, a library, a non-panelist home, etc. While in the illustrated example a single media presentation location 115 is shown, any number and/or type(s) of media exposure measurement locations may additionally or alternatively be used.

The example network gateway 120 of the illustrated example of FIG. 1 is a router that enables the media presentation devices 125, 130 to communicate with the network 110 (e.g., the Internet). In some examples, the network gateway 120 includes gateway functionality such as modem capabilities. In some other examples, the example network gateway 120 is implemented in two or more devices (e.g., a router, a modem, a switch, a firewall, etc.). In some examples, the example network gateway 120 hosts a LAN for the media exposure presentation location 115. In the illustrated example, the LAN is a wireless local area network (WLAN), and allows the media presentation devices 125, 130 to transmit and receive data to and/or from the Internet. Alternatively, the network gateway 120 may be coupled to such a LAN.

The example media presentation devices 125, 130 of FIG. 1 are devices that retrieve media from the example media provider 105 for presentation at the media exposure measurement location 115. In some examples, the media presentation devices 125, 130 are capable of directly presenting media (e.g., via a display) while, in some other examples, the media presentation devices 125, 130 present the media on separate media presentation equipment (e.g., speakers, a display, etc.). Thus, as used herein "media presentation devices" may or may not be able to present media without assistance from a second device. Media presentation devices are typically consumer electronics. For example, the first media presentation device 125 of the illustrated example is an Internet enabled television, and thus, is capable of directly presenting media (e.g., via an integrated display and speakers). The second media presentation device 130 of the illustrated example is a gaming console (e.g., Xbox®, PlayStation® 3, etc.) and employs additional media presentation equipment (e.g., a television, speakers, etc.) to present media. In some examples, one or more of the media presentation devices 125, 130 of the illustrated example is a personal computer (e.g., a tablet, a notebook computer, a desktop computer, etc.) which presents media via an associated display device which may or may not be integral to the computer. While in the illustrated example, an Internet enabled television, and a gaming console are shown, any other type(s) and/or number(s) of media presentation device(s) may additionally or alternatively be used. For example, Internet-enabled mobile handsets (e.g., a smartphone, an iPod®, etc.), video game consoles (e.g., Xbox®, PlayStation® 3, etc.), tablet computers (e.g., an iPad®, a Motorola™ Xoom™, etc.) digital media players (e.g., a Roku® media player, a Slingbox®, a Tivo®, etc.), personal computers (e.g., a desktop computer, a laptop computer, a netbook, etc.), etc. may additionally or alternatively be used. Thus, while in the illustrated example two media presentation devices are shown, any number of media presentation devices may be used.

The example meter 150 of the illustrated example of FIG. 1 includes a network communicator 152, a media identifier 154, a timestamper 156, and a metering data store 158. The example meter 150 identifies media presentation events (e.g., start events, stop events, etc.) and identifies the presented media associated with those events. In some examples, the meter 150 includes people metering functionality which detects individual panelists present in the vicinity of the meter 150 to identify individuals to whom the identified media was presented. In some examples, this functionality is provided by a separate people meter.

The example network communicator 152 of the illustrated example of FIG. 1 is an Ethernet interface. In the illustrated example, the network communicator 152 transmits metering data identified by the meter 150 to the central facility 170 via the network 110. While in the illustrated example, the network communicator 152 is an Ethernet interface, any other type(s) of interface may additionally or alternatively be used. For example, the network communicator 152 might include one or more of a Bluetooth interface, a WiFi interface, a digital subscriber line (DSL) interface, a T1 interface, etc. While in the illustrated example a single network communicator 152 is shown, any number and/or type(s) of network communicators may additionally or alternatively be used.

The example media identifier 154 of the illustrated example of FIG. 1 is implemented by a processor executing instructions, but it could alternatively be implemented by an application specific integrated circuit(s) (ASIC(s)), programmable logic device(s) (PLD(s)) and/or field programmable logic device(s) (FPLD(s)), or analog and/or digital other circuitry. In the illustrated example, the media identifier 154 identifies media presentation events from data and/or signals collected by and/or input to the meter 150 in any manner (e.g., free field audio detected by the meter 150 with a microphone exposed to ambient sound). In the example of FIG. 1, the media identifier 154 extracts and/or analyzes codes and/or signatures from data and/or signals collected by and/or input to the meter 150. The metadata, codes, signatures, and/or identifications of the media are stored in the metering data store 158.

The example timestamper 156 of the illustrated example of FIG. 1 is implemented by a processor executing instructions, but could alternatively be implemented by an ASIC, DSP, FPGA, or other analog and/or digital circuitry. The media identifier 154 and the timestamper 156 may be implemented by the same physical processor. In the illustrated example of FIG. 1, the timestamper 156 timestamps media identifications stored in the metering data store 158 by the media identifier. Timestamping (e.g., recording a time and/or a date that an event occurred) enables accurate identification and/or correlation of media that was presented with persons in the audience.

The example metering data store 158 of the illustrated example of FIG. 1 may be implemented by any device for storing data such as, for example, flash memory, magnetic media, optical media, etc. Furthermore, the data stored in the metering data store 158 may be in any data format such as, for example, binary data, comma delimited data, tab delimited data, structured query language (SQL) structures, etc. While in the illustrated example the metering data store 158 is illustrated as a single database, the metering data store 158 may be implemented by any number and/or type(s) of databases.

The example central facility 170 of the illustrated example is implemented by one or more servers that collect and process audience measurement data (e.g., metering data, DNS requests, tagging data, etc.) from the media presentation devices 125, 130 and/or the meter 150 (e.g., via the gateway 120) to generate media monitoring information and/or reports. The central facility 170 analyzes the audience measurement data to identify, for example, which media presentation devices are the most-frequently owned, which media presentation device are the most-frequently used, which media presentation device are the least-frequently owned, which media presentation device are the least-frequently used, which media providers are the most/least-frequently used, when particular media is presented, and/or any other media statistics or information that may be determined from the data. In some examples, the central facility 170 analyzes the audience measurement data to identify the most/least-frequently used type(s) of media presentation devices for particular type(s) and/or genre(s) of media. The audience measurement data may also be correlated or processed with factors such as demographic and/or geodemographic data (e.g., a geographic location of the media exposure measurement location, age(s) of the panelist(s) associated with the media presentation location, an income level of a panelist, etc.) to facilitate extrapolation and/or projection of media exposure to population(s) of interest. Media presentation device information may be useful to manufacturers and/or advertisers to determine which features should be improved, determine which features are popular among users, identify geodemographic trends with respect to media presentation devices, identify market opportunities, develop and/or create advertisements and/or advertisement campaigns, determine amounts to be paid for advertisements, and/or otherwise evaluate their own and/or their competitors' products and/or marketing efforts. Media provider information may be useful to media providers, advertisers, etc. to determine costs of advertisements broadcast by the media provider, comparative levels of customers that use different media providers, etc.

Figure 2:
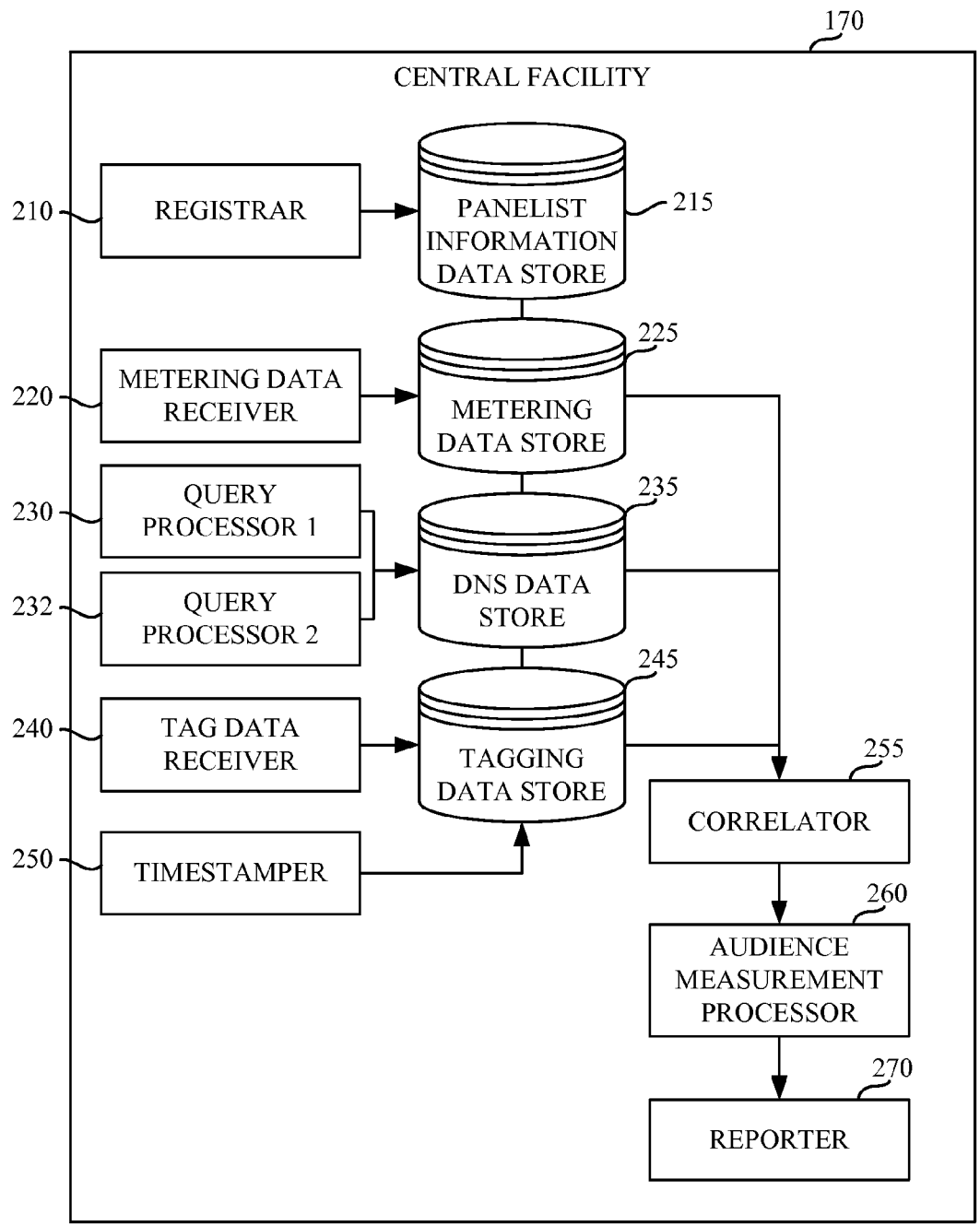
FIG. 2 is an example implementation of the example central facility of FIG. 1.

FIG. 2 is an example implementation of the example central facility of FIG. 1. The example central facility 170 includes a registrar 210, a panelist information data store 215, a metering data receiver 220, a metering data store 225, a first query processor 230, a second query processor 232, a DNS data store 235, a tag data receiver 240, a tagging data store 245, a timestamper 250, a correlator 255, an audience measurement processor 260, and a reporter 270.

The example registrar 210 of the illustrated example of FIG. 2 is implemented by a processor executing instructions, but it could alternatively be implemented by an application specific integrated circuit(s) (ASIC(s)), programmable logic device(s) (PLD(s)) and/or field programmable logic device(s) (FPLD(s)), or other circuitry. In the example of FIG. 2, the registrar 210 receives registration data and/or information from a panelist and creates a record identifying the panelist and/or their respective media presentation devices 125, 130. The registration data is then stored in the panelist information data store 215 in or in association with the record. In the illustrated example, the received registration data includes demographic information. However, any other information may additionally or alternatively be collected. The registration data may include, for example, information identifying the type(s), number(s), model(s), etc. of media presentation device(s) associated with the panelist, a physical mailing address associated with the panelist, an email address associated with the panelist, information regarding how the panelist receives Internet services (e.g., Internet Service Provider (ISP) information), a unique identifier of the panelist (e.g., a public IP address associated with the panelist and/or any combination or derivation of any information related to the panelist and/or media presentation device(s)), the age of the panelist, the gender of the panelist, the race of the panelist, the marital status of the panelist, the income of the panelist and/or the household of the panelist, the employment status of the panelist, where the panelist typically intends to use their media presentation device(s), how long the panelist has owned their device(s), the education level of the panelist and/or any other information related to the panelist or the media presentation device (s). The panelist information data store 215 of the illustrated example reflects any relationships between panelists such as, for example, which panelists belong to the same household.

In the illustrated example, the registration data is received by the registrar 210 via an electronic interface (e.g., by a panelist entering data into a form at a website or answering survey questions at a website). However, the registrar 210 may receive the registration data in other ways. For example, the registrar 210 may receive the registration data via a personal interview (by telephone and/or in person), an automated telephone interface, direct mailing, purchased lists, a third party service, etc. While the registrar 210 of the illustrated example is an electronic system, the registrar 210 may alternatively be implemented manually by a person or group of people collecting and/or entering the registration data into the panelist information data store 215.

Upon receiving the registration data, the registrar 210 of the illustrated example creates a record associating the panelist, the media presentation device(s) associated with the panelist, and the collected demographic information. The registrar 210 of the illustrated example also assigns a unique alphanumeric identifier to the panelist or media presentation device(s). The identifier may be based on, for example, a model number and/or type of the media presentation device. The record is stored in the panelist information data store 215. In the illustrated example, the registrar 210 determines a public IP address associated with the panelist and/or media exposure measurement location and stores the public IP address in the record (or in association with the record for that panelist and/or media exposure measurement location.) In some examples, the registrar 210 determines the public IP address associated with the panelist and/or media exposure measurement location by performing a DNS lookup. Additionally or alternatively, the registrar 210 might determine the public IP address associated with the panelist and/or media exposure measurement location by inspecting an IP address field of the registration data when the registration data is submitted electronically.

In some examples, when an ISP assigns a public IP address to a media exposure measurement location, the public IP address is a dynamic IP address. Dynamic IP addresses are typically leased to media exposure measurement locations for a specified period of time (e.g., one week, one month, etc.). Upon expiration of the specified period of time, a different public IP address may be assigned to the media exposure measurement location. Thus, the registrar 210 may receive a public IP address associated with the media exposure measurement location that becomes invalid or assigned to a different media exposure measurement location upon expiration of the IP address lease. Accordingly, in some examples, a dynamic DNS system is used to associate a media exposure measurement location with a dynamic IP address. When the public IP address of the media exposure measurement location changes, a device on the LAN (e.g., the network gateway 120, the media presentation devices 125, 130, the meter 150, etc.) updates a dynamic DNS record hosted by a dynamic DNS service to associate a dynamic DNS domain name with the newly leased public IP address. In some examples, the registrar 210 monitors the dynamic DNS domain name at the dynamic DNS service to determine if the public IP address associated with the media exposure measurement location has changed and, upon detecting a change, updates the records stored in the panelist information data store 215. In some examples, the registrar 210 monitors the dynamic DNS service to determine the domain name associated with a public IP address via, for example, a reverse domain name service query. In some examples, the registrar 210 hosts the dynamic DNS service and updates the records stored in the panelist information data store 215 upon receiving a notification from a device on the LAN (e.g., the network gateway 120, the media presentation devices 125, 130, the meter 150, etc.) that the public IP address associated with the media exposure measurement location has changed.

In some examples, the registrar 210 associates the media presentation devices 125, 130 with a corresponding query processor 230, 232. In the illustrated example, each media presentation device 125, 130 sharing a same public IP addresses is associated with a different query processor 230, 232. However, media presentation devices from different media exposure measurement locations (i.e., having different public IP addresses) may be associated with the same query processor 230, 232. When associating the media presentation devices 125, 130 with a specific query processor 230, 232, the registrar 210 of the illustrated example balances the number of media presentation devices associated with various query processors 230, 232. For example, if a particular query processor 230, 232 is associated with a large number of media presentation devices (e.g., ten thousand devices), the registrar 210 may associate the media presentation device with another, different, query processor 230, 232 that is presently associated with fewer media presentation devices.

In the illustrated example, after the registrar 210 has received registration data and associated the media presentation devices 125, 130 with the corresponding query processors 230, 232, the registrar 210 of the illustrated example creates an instruction document. The instruction document of the illustrated example instructs the panelist to enter information regarding the DNS server association into the media presentation device(s) 125, 130 associated with the panelist and/or the media presentation location 115. Additionally or alternatively, the instruction document may instruct an installer from a media monitoring company or anyone else who may configure and/or program the media presentation device(s) 150, 155, and/or 160. In the illustrated example, the instruction document is electronically transmitted to the panelist. For example, the instruction document may be transmitted to an email address associated with the panelist. However, in some examples, the instruction document is physically sent to the panelist (e.g., by mailing a printed form of the instruction document through a postal service such as the U.S. mail, etc.).

The example panelist information data store 215 of the illustrated example of FIG. 2 may be implemented by any device for storing data such as, for example, flash memory, magnetic media, optical media, etc. Furthermore, the data stored in the panelist information data store 215 may be in any data format such as, for example, binary data, comma delimited data, tab delimited data, structured query language (SQL) structures, etc. While in the illustrated example the panelist information data store 215 is illustrated as a single database, the panelist information data store 215 may be implemented by any number and/or type(s) of databases and/or may be combined with any other database such as, for example, the metering data store 225, the DNS data store 235, and/or the tagging data store 245.

The example metering data receiver 220 is implemented by a processor executing instructions, but it could alternatively be implemented by an ASIC, PLD, FPLD, and/or other circuitry. The registrar 210, and/or the metering data receiver 220 may be implemented by the same physical processor. In the example of FIG. 2, the metering data receiver 220 receives metering data from the meter 150 and stores a record identifying the panelist, the media that was identified and/or identifying information thereof, etc. The metering data is stored in the metering data store 225. In the illustrated example, the received metering data includes a panelist identifier, a timestamp identifying a media presentation event (e.g., a start, a stop, etc.), a type of the media presentation event, data associated with the media presentation event, a detected media presentation device, etc. However, any other information may additionally or alternatively be collected.

The example metering data store 225 of the illustrated example of FIG. 2 may be implemented by any device for storing data such as, for example, flash memory, magnetic media, optical media, etc. Furthermore, the data stored in the metering data store 225 may be in any data format such as, for example, binary data, comma delimited data, tab delimited data, structured query language (SQL) structures, etc. While in the illustrated example the metering data store 225 is illustrated as a single database, the metering data store 225 may be implemented by any number and/or type(s) of databases and/ or may be combined with any other database such as, for example, the panelist information data store 215, the DNS data store 235, and/or the tagging data store 245.

The central facility 170 of the illustrated example includes one or more query processor(s) 230, 232. In the illustrated example, each media presentation device 125, 130 within a particular media presentation location (e.g., the location 115) is associated with a respective different query processor 230, 232. Thus, when a given query processor 230, 232 receives a DNS query from a public IP address of the particular media presentation location 115, the central facility 170 is able to inherently identify the media device that originated the query based on a public IP address of the media exposure measurement location (e.g., the location 115) because all requests from that given public IP address come from a certain media presentation device. In other words, the combination of the network address of the query processor 125, 130 (e.g., a destination address) and the originating public IP address (e.g., the originating address) specifically identifies a particular originating device (e.g., a media presentation device). The requests and/or identifying information thereof are stored in the DNS data store 235.

Each query processor 230, 232 of the illustrated example of FIG. 2 implements, is implemented at, or is otherwise associated with a respective DNS server. Each query processor 230, 232 may receive DNS queries from the same public IP address of the monitored location (e.g., the location 115). In some examples, each query processor 230, 232 responds to a DNS query with the same requested DNS information in the same manner as a conventional DNS server. In other examples, the query processor 230, 232 does not actually return the requested DNS information in response to a DNS query, but instead responds to the DNS query with a redirect message, to redirect the querying device (e.g., a media presentation device) to a different DNS server. In some such examples, the query processor may not be implemented by and/or implement a conventional DNS server, but instead may be thought of as a pseudo-DNS server whose function is to log DNS queries and to redirect such queries to a conventional DNS server for service, but which does not actually contain a domain name to IP address lookup table.

In examples where more than one query processor(s) 230, 232 are used, the query processor(s) 230, 232 are identified by different IP addresses. For example, a first query processor 230 might have a first IP address, while a second query processor 232 might have a second IP address different from the first IP address. Thus, when respective media devices (e.g., media presentation devices) are associated with respective ones of the query processors 230, 232, a first media device may be associated with, and should make DNS queries to, the first IP address (e.g., to the first query processor 230) while a second media device may be associated with, and should make DNS queries to, the second IP address (e.g., to the second query processor 232). Further, in some examples, virtual IP addresses are used, thereby enabling multiple query processor(s) 230, 232 to be associated with a single physical connection to the network 110.

Each of the query processors 230, 232 of the illustrated example of FIG. 2 is implemented by a processor executing instructions, but they could alternatively be implemented by an ASIC, DSP, FPGA, or other circuitry. The query processors 230, 232, the registrar 210, and/or the metering data receiver 220 may be implemented by the same physical processor. In the illustrated example, the query processors 230, 232 function as pseudo-DNS server(s) (e.g., a DNS server with no translation functionality), and respond to DNS queries with DNS redirect messages. In some examples, some or all of the query processors 230, 232 implement conventional DNS servers, where the query processors 230, 232 receive DNS queries and respond to the queries with the requested DNS information. In some examples, some or all of the query processors 230, 232 function as DNS proxies and retrieve DNS information from a separate DNS server on behalf of the DNS query originating device. Additionally or alternatively, the query processors 230, 232 may cache and/or store DNS information from the separate DNS server so that DNS information may more quickly be transmitted in response to future received DNS queries.

The example DNS data store 235 of the illustrated example of FIG. 2 may be implemented by any device for storing data such as, for example, flash memory, magnetic media, optical media, etc. Furthermore, the data stored in the DNS data store 235 may be in any data format such as, for example, binary data, comma delimited data, tab delimited data, structured query language (SQL) structures, etc. While in the illustrated example the DNS data store 235 is illustrated as a single database, the DNS data store 235 may be implemented by any number and/or type(s) of databases and/or may be combined with any other database such as, for example, the panelist information data store 215, the metering data store 225, and/or the tagging data store 245.

The example tag data receiver 240 of the illustrated example of FIG. 2 is implemented by a processor executing instructions, but they could alternatively be implemented by an ASIC, DSP, FPGA, or other circuitry. The, the registrar 210, the metering data receiver 220, query processors 230, 232, and/or the tag data receiver 240 may be implemented by the same physical processor. In the illustrated example, the tag data receiver 240 receives tagging data from the media presentation devices 125, 130. In the illustrated example, the tagging data includes an IP address and/or an identifier of the panelist, a timestamp, and/or data representing and/or indicative of the presented media.

The example tagging data store 245 of the illustrated example of FIG. 2 may be implemented by any device for storing data such as, for example, flash memory, magnetic media, optical media, etc. Furthermore, the data stored in the tagging data store 245 may be in any data format such as, for example, binary data, comma delimited data, tab delimited data, structured query language (SQL) structures, etc. While in the illustrated example the tagging data store 245 is illustrated as a single database, the tagging data store 245 may be implemented by any number and/or type(s) of databases and/or may be combined with any other database such as, for example, the panelist information data store 215, the metering data store 225, and/or the DNS data store 235.

The timestamper 250 of the illustrated example of FIG. 2 is implemented by a processor executing instructions, but could alternatively be implemented by an ASIC, DSP, FPGA, or other analog and/or digital circuitry. The registrar 210, the metering data receiver 220, the query processors 230, 232, the tag data receiver 240, and/or the timestamper 250 may be implemented by the same physical processor. In the illustrated example of FIG. 2, the timestamper 250 timestamps data and/or information received by the registrar 210, the metering data receiver 220, the query processors 230, 232, and/or the tag data receiver 240 upon receipt. Timestamping (e.g., recording a time and/or date that an event occurred) enables accurate identification and/or correlation of media that was presented and/or the time that it was presented.

The example correlator 255 of the illustrated example of FIG. 2 is implemented by a processor executing instructions, but it could alternatively be implemented by an ASIC, DSP, FPGA, or other circuitry. The correlator 255 may be implemented on the same physical processor as the registrar 210, the metering data receiver 220, the query processors 230, 232, the tag data receiver 240, and/or the timestamper 250. In the illustrated example, the correlator 255 correlates data and/or information stored in the panelist information data store 215, the metering data store 225, the DNS data store 235, and/or the tagging data store 245. The correlator 255 identifies the media exposure measurement location 115 and/or the panelist by associating the public IP address of received DNS queries with a record of the public IP address associated with the media exposure measurement location stored in the panelist information data store 215. In some examples, the correlator 255 identifies a DNS query originating device (e.g., a media presentation device 125, 130) of the DNS query based on the association of the query processor 230, 232 and the media exposure measurement location 140 stored in the panelist information data store 215.

The example audience measurement processor 260 of the illustrated example of FIG. 2 credits the panelist associated with the media presentation location 115, and/or the media presentation device 125, 130 with an exposure to the media identified in the received metering data (e.g., the data received by the metering data receiver 220), the DNS data (e.g., the data received by the query processor(s) 230, 232), and/or the tagging data (e.g., the data received by the tag data receiver 240). In the illustrated example, the audience measurement processor 260 is implemented by a processor executing instructions, but it could alternatively be implemented by an ASIC, DSP, FPGA, or other circuitry. The audience measurement processor 260 may be implemented on the same physical processor as the registrar 210, the metering data receiver 220, the query processors 230, 232, the tag data receiver 240, the timestamper 250, and/or the correlator 255.

The example reporter 270 of the illustrated example of FIG. 2 is implemented by a processor executing instructions, but it could alternatively be implemented by an ASIC, DSP, FPGA, or other circuitry. The reporter 270 may be implemented on the same physical processor as the registrar 210, the metering data receiver 220, the query processors 230, 232, the tag data receiver 240, the timestamper 250, the correlator 255, and/or the audience measurement processor 260. The reporter 270 generates reports indicative of media exposure metrics based on one or more different types of client devices (e.g., personal computers, portable devices, mobile phones, tablets, etc.). For example, the reporter 270 compiles media exposure metrics based the correlation of the metering data, the DNS data, and/or the tagging data, and/or on the crediting thereof. A report is then generated based on the crediting performed by the audience measurement processor 260 to indicate exposure measurements (e.g., for a type of media (e.g., a genre)) using different types of client devices. In some examples, the exposure measurements indicate ratings information for different media (e.g., a particular television show, a particular website, a particular movie, etc.) In some examples, the exposure measurements indicate ratings information for different media providers. However, in some other examples, the report identifies information specific to particular types of media. Thus, for example, reports indicating the popularity of watching, for instance, sports events on certain types of client devices (e.g., mobile devices, tablets, etc.) can be compared to other popularities of watching sports events on other types of client devices (e.g., televisions, personal computers, etc.).

Additionally or alternatively, popularities of different types of media across different device types may be reported. Such different types of media may be, for example, news, movies, television programming, on-demand media, Internet-based media, games, streaming games, advertisements, etc. Such comparisons may be made across any type(s) and/or numbers of devices including, for example, cell phones, smart phones, dedicated portable multimedia playback devices, iPod® devices, tablet computing devices (e.g., an iPad®), standard-definition (SD) televisions, high-definition (HD) televisions, three-dimensional (3D) televisions, stationary computers, portable computers, Internet radios, etc. Any other type(s) and/or number of media and/or devices may be analyzed. The report may also associate the media exposure metrics with demographic segments (e.g., age groups, genders, ethnicities, etc.) corresponding to the user(s) of the client device(s). Additionally or alternatively, the report may associate the media exposure metrics with metric indicators of the popularity of the artist, genre, song, title, etc., across one or more user characteristics selected from one or more demographic segment(s), one or more age group(s), one or more gender(s), and/or any other user characteristic(s).

In some examples, the media exposure metrics are used to determine demographic reach of streaming media, ratings for streaming media, engagement indices for streaming media, user affinities associated with streaming media, broadcast media, and/or any other audience measure metric associated with streaming media and/or locally stored media. While in the illustrated example, the media exposure metrics are used to provide information for streaming media, the media exposure metrics may be used to provide information for any other type of media such as, for example, websites, non-streaming media, etc. In some examples, the media exposure metrics are audience share metrics indicative of percentages of audiences for different device types that accessed the same media. For example, a first percentage of an audience may be exposed to news media via smart phones, while a second percentage of the audience may be exposed to the same news media via tablets.

Figure 3:
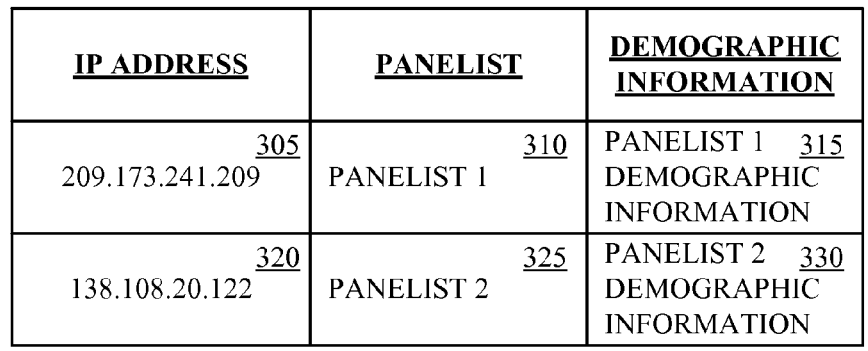
FIG. 3 is an example data table representing an association of a panelist with an Internet Protocol (IP) address.

FIG. 3 is an example data table 300 that may be stored at the central facility of FIGS. 1 and/or 2. The example data table 300 represents an association of a panelist with their respective Internet Protocol (IP) address. The example data table 300 of FIG. 3 is stored in the panelist information data store 215. However, the example data table 300 may be stored in any other location. The example data table 300 of FIG. 3 includes a first IP address 305 in association with a first panelist 310 and in further association with demographic information 315 related to the first panelist 310. The example data table 300 includes a second IP address 320 in association with a second panelist 325 and in further association with demographic information 330 related to the second panelist 325.

While in the illustrated example the IP addresses 305, 310, the panelist identifiers 310, 325, and the demographic information 315, 330 are stored in the same data table 300, in some examples the IP addresses 305, 310, the panelist identifiers 310, 325, and the demographic information 315, 330 may be stored in separate data tables. For example, the IP addresses 305, 320 and the panelist identifiers 310, 325 may be stored in a first data table while the panelist identifiers 310, 325 may be stored in a second data table 315, 330.

Figure 4:
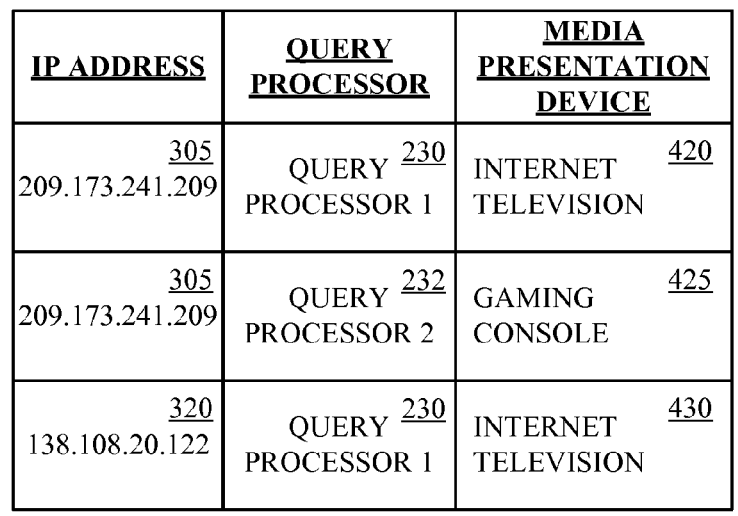
FIG. 4 is an example data table representing an association of the IP address of FIG. 3, the query processors of FIG. 2, and the media presentation devices of FIG. 1.

FIG. 4 is an example data table 400 that may be stored at the central facility of FIGS. 1 and/or 2. The example data table 400 of FIG. 4 represents association(s) of the IP address(S) of FIG. 3 with respective ones of the query processors of FIG. 2 and the media presentation devices of FIG. 1. The example data table 400 of FIG. 4 is stored in the panelist information data store 215. However, the example data table 400 may be stored in any other location. Each row of the example data table 400 includes an IP address, a query processor 230, 232, and an identifier 420, 425, 430 of a media presentation device 125, 130 of a particular panelist. The data table 400 enables the correlator 255 to identify the panelist 310, 325 and/or the media presentation device 420, 425, 430 associated with a DNS query based on the originating IP address 305, 320 and the destination address of the query processor 230, 232 to which the DNS query was directed. While in the illustrated example each record associates the query processor 230, 232 and the media presentation device based on the originating IP address 305, 320, in some examples the panelist identifier 310, 325 is additionally or alternatively used to associate the query processor 230, 232 and the media presentation device.

FIG. 5 is an example data table 500 that may be stored at the central facility of FIGS. 1 and/or 2. The example data table of FIG. 5 represents records of Domain Name Service (DNS) queries originating from the IP address of FIG. 3 and received by the query processors of FIG. 2. The example data table 500 of FIG. 5 is stored in the DNS data store 215. However, the example data table 500 may be stored in any other location. The example data table 500 includes records 510, 520, 530 of DNS queries received by the query processors 230, 232. However any number of records may additionally or alternatively be included. The example data table 500 records the IP address that originated the DNS query, the query processor 230, 232 that received the DNS query, a domain that was requested in the DNS query 550, 555, and a timestamp of when each DNS query was received 512, 522, 532. As described in connection with FIG. 6, storing the requesting IP address 305, 320 and the query processor receiving each DNS query 230, 232 enables the correlator 255 to identify the panelist associated with the DNS query as well as the media presentation device 420, 425, 430 that made the DNS query.

FIG. 6 is an example data view 600 that may be stored and/or generated at the central facility of FIGS. 1 and/or 2. In this example, records 610, 620, 630 represent an association between the panelist of FIG. 3, the media presentation devices of FIGS. 1 and/or 4, and the DNS records of FIG. 5. While in the illustrated example three records are shown, any other number of records may additionally or alternatively be included. In the illustrated example, the data view 600 of FIG. 6 is stored in the DNS data store 235 and/or generated by the correlator 255. The example data view 600 includes a panelist identifier 310, 325, an identifier of the corresponding media presentation device 420, 425, 430, the provider domain 550, 555 requested by the media presentation device 420, 425, 430 of the panelist 310, 325, and a timestamp of when the DNS request was received. In the illustrated example, the data view 600 enables the correlator 255 and/or the audience measurement processor 260 to credit the panelist 305, 320 with exposure to media received from the requested domain 550, 555 via the media presentation device 420, 425, 430.

FIG. 7 is an example data table 700 that may be stored at the central facility of FIGS. 1 and/or 2. The example data table 700 of FIG. 7 represents metering data received from the meter of FIG. 1. The example data table 700 of FIG. 7 is stored in the metering data store 225. However, the example data table 700 may be stored in any other location. The example data table 700 includes records 705, 710, 715, 720, 725, 730, 725 representing events associated with metering data received by the metering data receiver 220. The example data table 700 records a panelist identifier 310, 320, a timestamp 770, 775, 780, 785, 790, 795, 797, media presentation events 771, 776, 781, 786, 791, 796, 798, media presentation data 777, and an identified media presentation device 420, 425, 730.

In the example of FIG. 7, the record 705 indicates that the meter 150 associated with the first panelist 310 identified a media start event 771 at 7:00 PM 770 with respect to a presentation by the Internet television 420. The record 710 indicates that the meter 150 associated with the first panelist 310 identified 776 that television show A 777 was presented by the Internet Television 420 at 7:03 PM 775. While in the illustrated example the television show A 777 is identified, any other media may additionally or alternatively be identified such as, for example, advertisements, radio, etc. The record 715 indicates that the meter 150 associated with the first panelist 310 identified a media stop event 780 at 8:00 PM 780 with respect to the presentation by the Internet television 420.

In the example of FIG. 7, the record 720 indicates that the meter 150 associated with the first panelist 310 identified a media start event 786 at 9:30 PM 785 with respect to a presentation by the gaming console 425. In the illustrated example, the media presented by the gaming console 425 is not identified by the meter 150. However, as explained in connection with FIGS. 8, 9, and/or 10 the received tagging data enables the media presented by the gaming console 425 to be identified. The record 725 indicates that the meter 150 associated with the first panelist 310 identified a media stop event 791 at 10:00 PM 790 with respect to a presentation by the gaming console 425.

In the illustrated example, the record 730 indicates that the meter 150 associated with the second panelist 325 identified a media start event 796 at 10:30 PM 795 with respect to a presentation by the Internet television 430. In the illustrated example, the media presented by the Internet television 430 is not identified by the meter 150 and is not identified by tagging data. However, as explained in connection with FIG. 10, the correlator 255 is able to determine that media was presented via the domain 555 via the Internet television 430. The record 735 indicates that the meter 150 associated with the second panelist 325 identified a media stop event 798 at 11:30 PM 797 with respect to a presentation by the Internet television 430.

While in the illustrated example each record indicates a particular event (e.g., a media start event, a media stop event, a media identification event, etc.) any other data table configuration may additionally or alternatively be used. For example, each record may indicate a media start event, a media stop event, whether the media was identified and/or identification data for the identified media.

Figure 8:
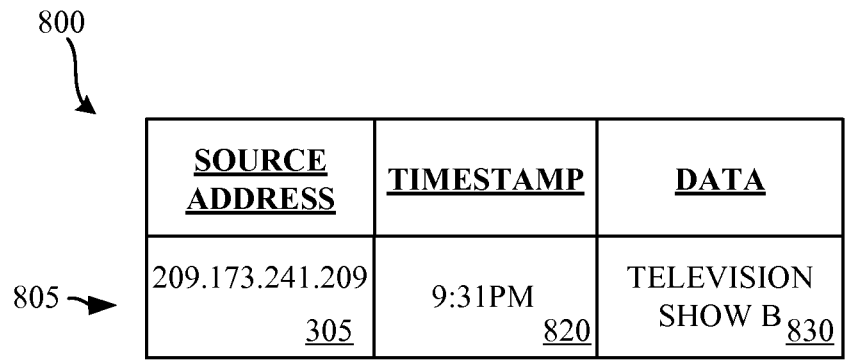
FIG. 8 is an example data table representing tagging data received from the media presentation devices of FIGS. 1 and/or 4 in association with the IP address(es) of FIG. 3.

FIG. 8 is an example data table 800 that may be stored at the central facility of FIGS. 1 and/or 2. The example data table 800 of FIG. 8 represents tagging data received from the media presentation devices of FIGS. 1 and/or 4 in association with the IP address(es) of FIG. 3. The example data table 800 of FIG. 8 is stored in the tagging data store 245. However, the example data table 800 may be stored in any other location. The example data table 800 includes record 805 representing tagging information received via the tag data receiver 240. The example data table 800 records a source address 305 from which the tag data was received, a timestamp 820 of when the tag data was received, and the tag data indicating that television show B 830 was received. While in the illustrated example a television show is identified, any other type of media may additionally or alternatively be identified such as, for example, radio, advertisements, etc.

Figure 9:
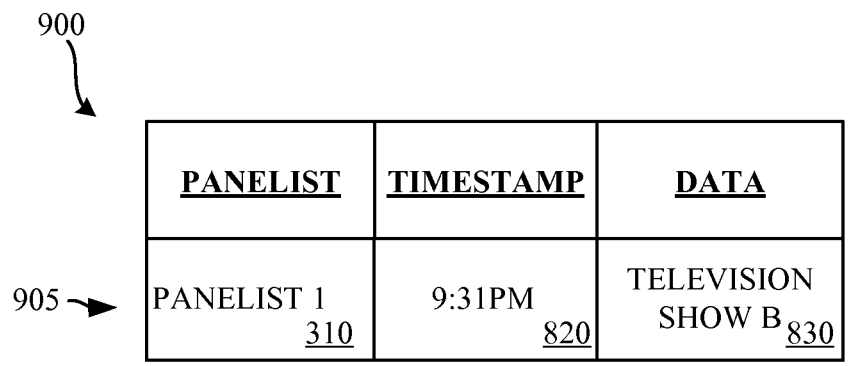
FIG. 9 is an example data view representing an association of the panelist of FIG. 3 and the tagging data of FIG. 8.

FIG. 9 is an example data view 900 that may be stored and/or generated at the central facility of FIGS. 1 and/or 2. In the example of FIG. 9, record 905 represents an association of the panelist of FIG. 3 and the tagging data of FIG. 8. While in the illustrated example one record is shown, any other number of records may additionally be included. In the illustrated example, the data view 900 of FIG. 9 is stored in the tagging data store 245 and/or generated by the correlator 255. The example data view 900 includes a panelist identifier 310, 320, a timestamp 820, and the tag data indicating that television show B 830 was received. In the illustrated example, the data view 900 enables the correlator 255 and/or the audience measurement processor 260 to credit the panelist 310, 325 with exposure to the identified media 830.

FIG. 10 is an example data view 1000 that may be stored and/or generated at the central facility of FIGS. 1 and/or 2. The data view 1000 of the illustrated example of FIG. 10 includes records 1005, 1010, 1015 representing an association of the panelist of FIG. 3 with the tagging data of FIG. 8, the metering data of FIG. 7, the DNS records of FIG. 5, and the media presentation device of FIG. 4. While in the illustrated example three records are shown, any other number of records may additionally or alternatively be included. In the illustrated example, the data view 1000 of FIG. 10 is generated by the correlator 255 and/or stored in at least one of the panelist information data store 215, the metering data store 225, the DNS data store 235, and/or the tagging data store 245.

In the example of FIG. 10, the first record 1005 of the example data view 1000 includes the panelist identifier 310, the timestamp 775 indicating that the television show A 777 was identified at 7:03 PM. The first record 1005 further identifies that the media was provided by Netflix.com 550 and was presented via the Internet television 420. The second record 1010 of the example data view 1000 includes the panelist identifier 310, the timestamp 820 indicating that the television show B 830 was identified at 9:31 PM. The second record 1010 further identifies that the media was provided by Hulu.com 555 and was presented via the gaming console 425. The third record 1015 of the example data view 1000 includes the panelist identifier 325, the timestamp 785 indicating that media was presented at 10:30 PM. The third record 1015 does not identify the media that was presented, but does identify that the media was provided by Hulu.com 555 and was presented via the Internet television 430.

Figure 11:
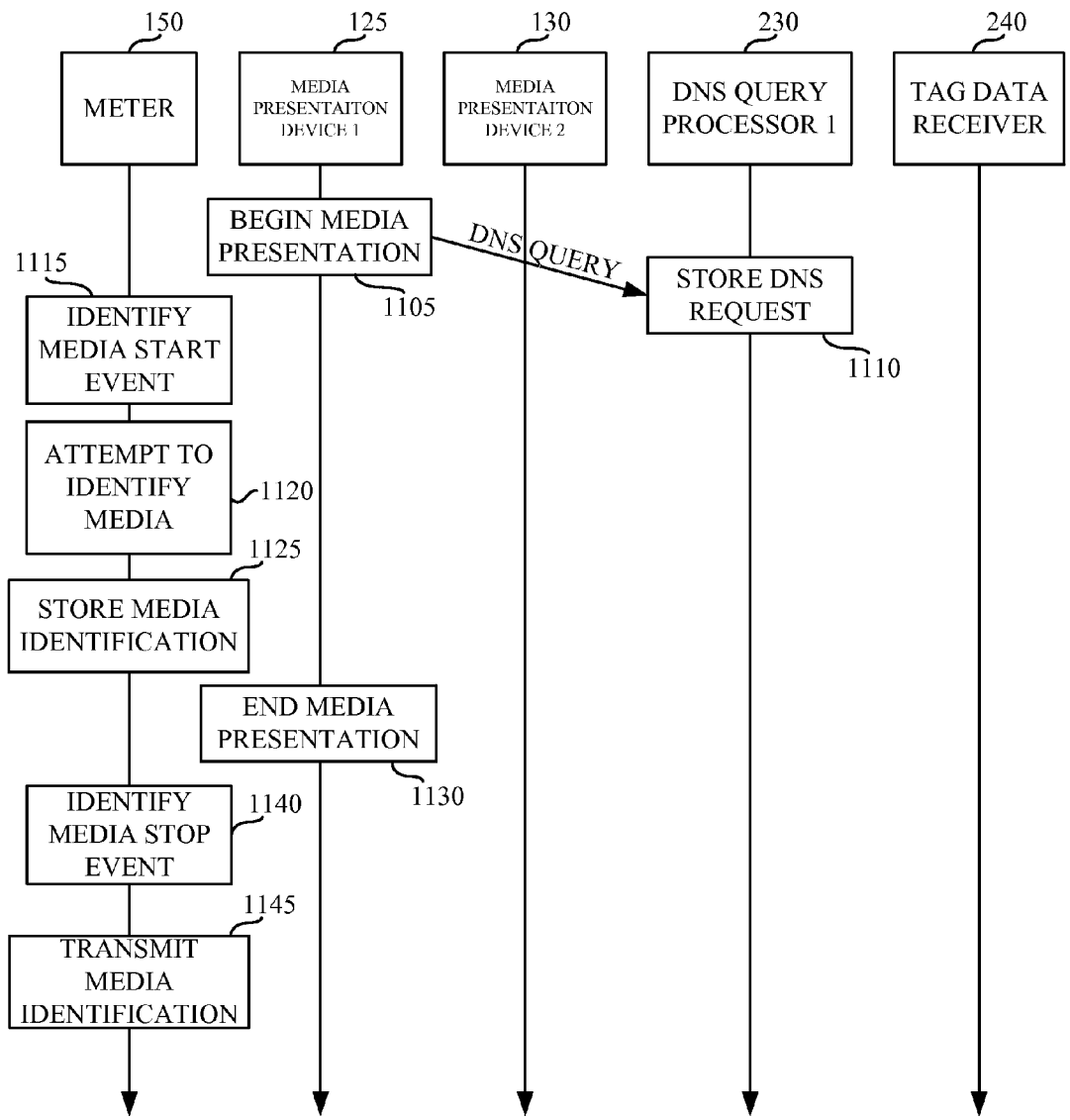
FIG. 11 is a communication diagram illustrating an example order of communication for receiving the DNS records of FIG. 5 and the metering data of FIG. 7.

FIG. 11 is a communication diagram 1100 illustrating an example order of communication for receiving the DNS records of FIG. 5 and the metering data of FIG. 7. The example order of communication represents the events that result in the example record 1005 of FIG. 10. The example order of communication begins when the first media presentation device 125 begins presenting media (block 1105). The first media presentation device 125 transmits a DNS query to the associated DNS query processor 230, and the DNS query processor 230 stores the DNS query and/or information associated therewith in the DNS data store 235 (block 1110). The first media presentation device 125 requests the media from the service provider identified by the DNS query and begins presenting the media.

The meter 150 identifies and records the media start event (e.g., record 705) (block 1115), and attempts to identify the presented media (block 1120). In the illustrated example, the meter 150 identifies the presented media using any media identification method(s) (e.g., metadata, codes, and/or signatures) that identify the media. The meter 150 then stores the media identification (e.g., record 710) (block 1125). The media presentation device 125 ends the media presentation (block 1130). Responsive to the end of the media presentation, the meter 150 identifies and records a media stop event (e.g., record 715) (block 1140). The meter 150 then electronically transmits the stored records to the metering data receiver 220 of the central facility 170 (block 1145). While in the illustrated example the records are stored at the meter 150 and then electronically transmitted to the metering data receiver 220 of the central facility 170, the records may be transmitted in any other fashion. For example, the records may be electronically streamed to the central facility 170, the records may be stored and then physically transferred (e.g., by mailing the meter 150 to the central facility 170).

Figure 12:
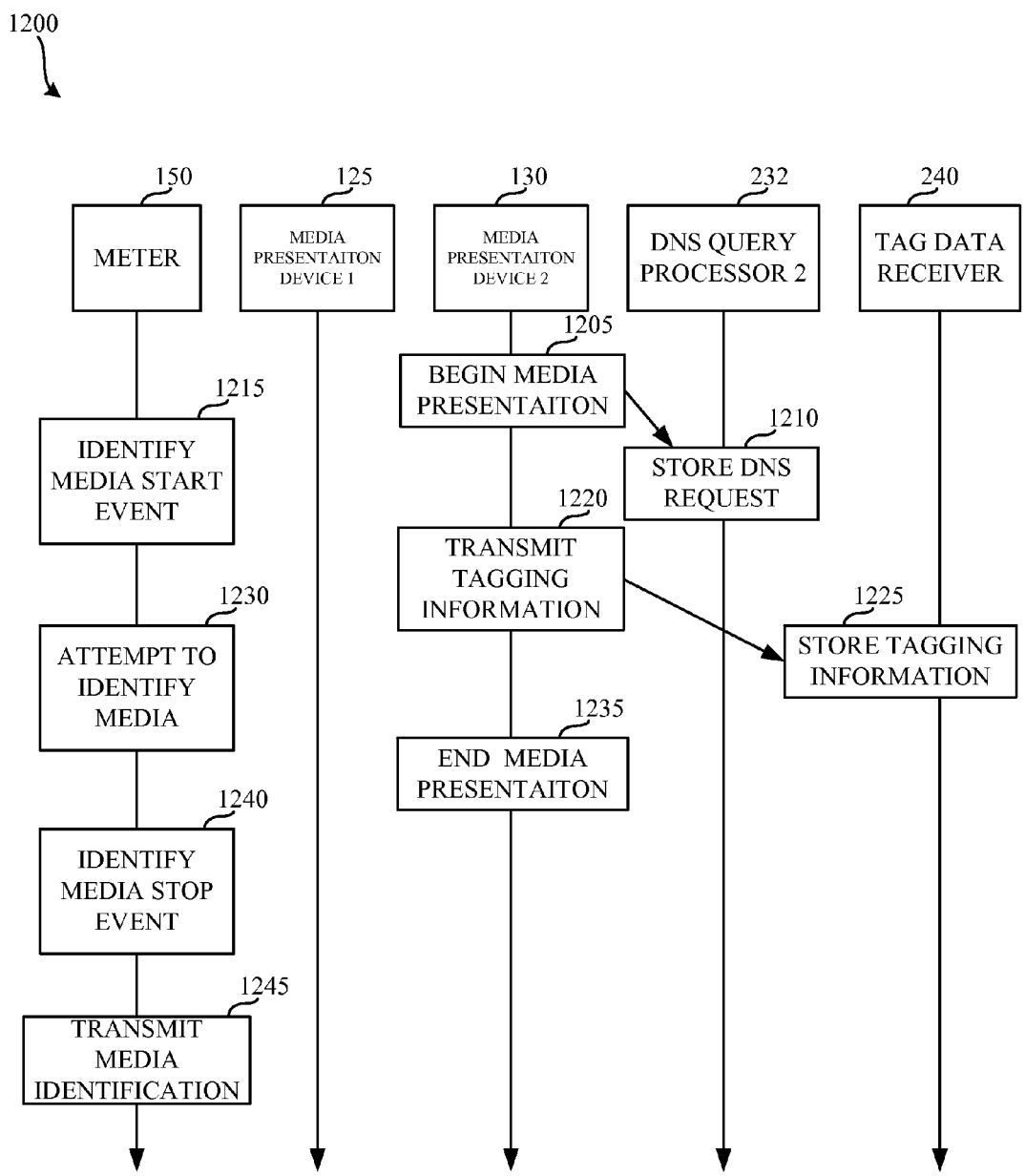
FIG. 12 is a communication diagram illustrating an example order of communication for receiving the tagging data of FIG. 8 and the metering data of FIG. 7.

FIG. 12 is a communication diagram 1200 illustrating an example order of communication for receiving the tagging data of FIG. 8 and the metering data of FIG. 7. The example order of communication represents the events that result in the record 1010 of FIG. 10. The example order of communication begins when the second media presentation device 130 begins presenting media (block 1205). The second media presentation device 130 transmits a DNS query to the associated DNS query processor 232, and the DNS query processor 232 stores the DNS query and/or information associated therewith in the DNS data store 235 (block 1210). The second media presentation device 130 requests the media from the service provider identified by the DNS query and begins presenting the media.

The meter 150 of the illustrated example identifies and records the media start event (e.g., record 720) (block 1215). Because the media includes a tagging instruction, the second media presentation device 130 transmits the tagging information to the tag data receiver 240 (block 1220). The tag data receiver 240 stores the received tag data in the tagging data store 245. Meanwhile, the meter 150 attempts to identify the presented media (block 1230). In the illustrated example, the meter 150 does not identify the media. The meter 150 might not identify the media for any number of reasons such as, for example, an audio and/or video signal associated with the media presentation is not loud enough to facilitate identification of a code and/or signature, the media presentation device (e.g., a tablet, a laptop, etc.) may not be near the meter 150, etc. The media presentation device 130 ends the media presentation (block 1235). Responsive to the end of the media presentation, the meter 150 identifies and records a media stop event (e.g., record 725) (block 1240). The meter 150 then electronically transmits the stored records to the metering data receiver 220 of the central facility 170 (block 1245). While in the illustrated example the records are stored at the meter 150 and then electronically transmitted to the metering data receiver 220 of the central facility 170, the records may be transmitted in any other fashion. For example, the records may be electronically streamed to the central facility 170, the records may be stored and then physically transferred (e.g., by mailing the meter 150 to the central facility 170).

While in the illustrated example, the presentation by the media presentation device 130 (e.g., a gaming console) is detected as streaming media from a media provider (e.g., Hulu.com), the media presentation device 130 may be involved in any other type of media presentation such as, for example, a game (e.g., a video game played by an Xbox, etc.). As such, the correlator may identify that media was not streamed, and that the media presentation device 130 and/or the panelist 310 should be credited with playing the game.

While an example manner of implementing the meter 150 of FIG. 1 and/or the central facility 170 of FIGS. 1 and/or 2 has been illustrated in FIGS. 1 and/or 2, one or more of the elements, processes and/or devices illustrated in FIGS. 1 and/or 2 may be combined, divided, re-arranged, omitted, eliminated and/or implemented in any other way. Further, the example network communicator 152, the example media identifier 154, the example timestamper 156, the example metering data store 158, the example meter 150, the example registrar 210, the example metering data receiver 220, the example query processors 230, 232, the example tag data receiver 240, the example timestamper 250, the example correlator 255, the example audience measurement processor 260, the example reporter 270, and/or, more generally, the example central facility 170 of FIGS. 1 and/or 2 may be implemented by hardware, software, firmware and/or any combination of hardware, software and/or firmware. Thus, for example, any of the example network communicator 152, the example media identifier 154, the example timestamper 156, the example metering data store 158, the example meter 150, the example registrar 210, the example metering data receiver 220, the example query processors 230, 232, the example tag data receiver 240, the example timestamper 250, the example correlator 255, the example audience measurement processor 260, the example reporter 270, and/or, more generally, the example central facility 170 of FIGS. 1 and/or 2 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example network communicator 152, the example media identifier 154, the example timestamper 156, the example metering data store 158, the example meter 150, the example registrar 210, the example metering data receiver 220, the example query processors 230, 232, the example tag data receiver 240, the example timestamper 250, the example correlator 255, the example audience measurement processor 260, the example reporter 270, and/or the example central facility 170 of FIGS. 1 and/or 2 are hereby expressly defined to include a tangible computer readable medium such as a memory, DVD, CD, Blu-ray, etc. storing the software and/or firmware. Further still, the example network communicator 152, the example media identifier 154, the example timestamper 156, the example metering data store 158, the example meter 150, the example registrar 210, the example metering data receiver 220, the example query processors 230, 232, the example tag data receiver 240, the example timestamper 250, the example correlator 255, the example audience measurement processor 260, the example reporter 270, and/or the example central facility 170 of FIGS. 1 and/or 2 may include one or more elements, processes and/or devices in addition to, or instead of, those illustrated in FIGS. 1 and/or 2, and/or may include more than one of any or all of the illustrated elements, processes and devices.

Figure 13:
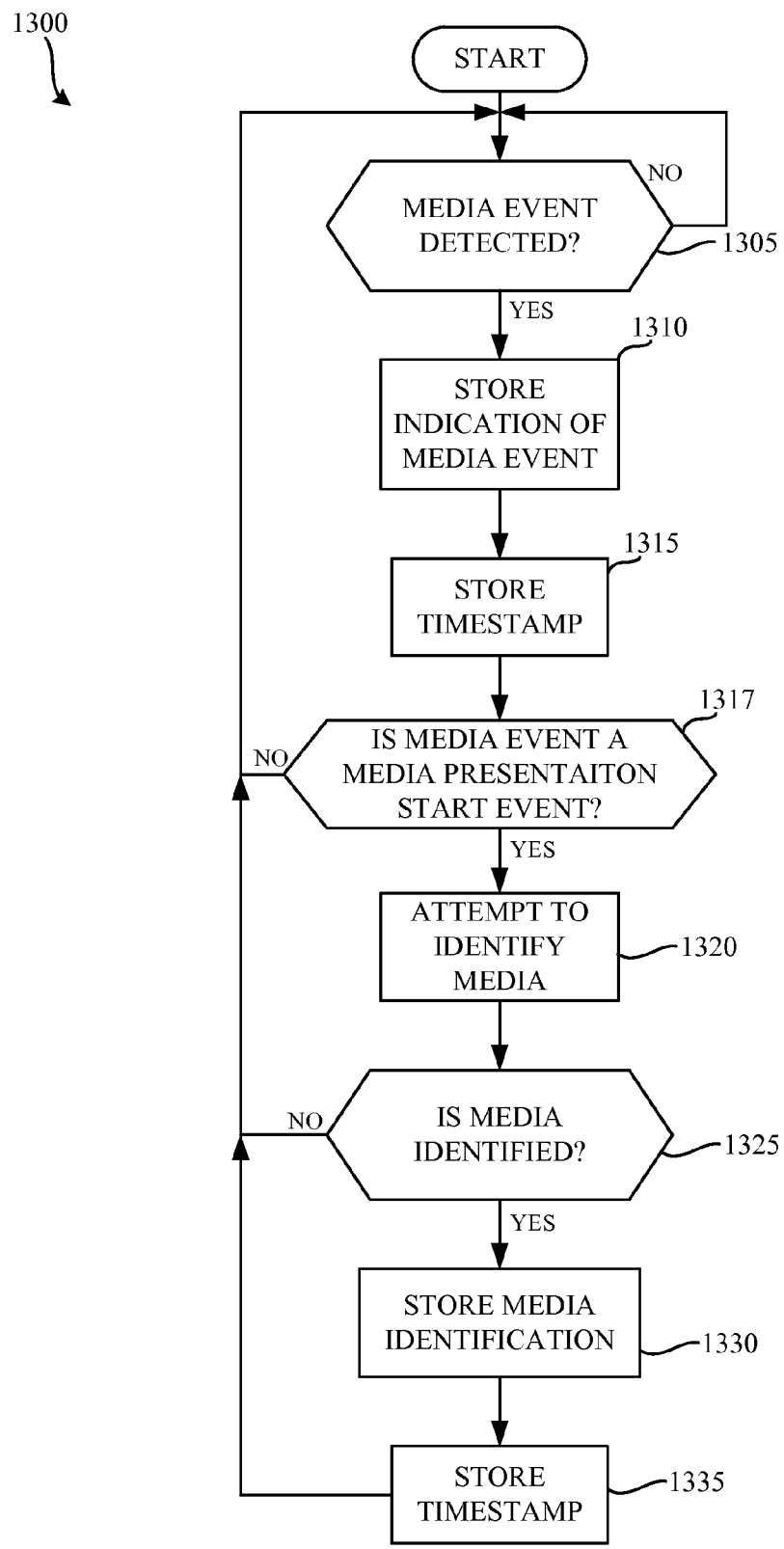
FIG. 13 is a flowchart representative of example machine-readable instructions which may be executed to implement the example meter of FIG. 1.

Flowcharts representative of example machine-readable instructions for implementing the example meter 150 of FIG. 1 are shown in FIGS. 13 and/or 14. Flowcharts representative of example machine-readable instructions for implementing the example central facility 170 of FIGS. 1 and/or 2 are shown in FIGS. 15 and/or 16. In these examples, the machine-readable instructions comprise program(s) for execution by a processor such as the processor 1712 shown in the example processor platform 1700 discussed below in connection with FIG. 17. The program may be embodied in software stored on a tangible computer-readable medium such as a CD-ROM, a floppy disk, a hard drive, a digital versatile disk (DVD), a Blu-ray disk, or a memory associated with the processor 1712, but the entire program and/or parts thereof could alternatively be executed by a device other than the processor 1712 and/or embodied in firmware or dedicated hardware. Further, although the example program is described with reference to the flowchart illustrated in FIGS. 13, 14, 15, and/or 16, many other methods of implementing the example meter 150 and/or the example central facility 170 may alternatively be used. For example, the order of execution of the blocks may be changed, and/or some of the blocks described may be changed, eliminated, or combined.

As mentioned above, the example processes of FIGS. 13, 14, 15, and/or 16 may be implemented using coded instructions (e.g., computer-readable instructions) stored on a tangible computer-readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer-readable medium is expressly defined to include any type of computer-readable storage and to exclude propagating signals. Additionally or alternatively, the example processes of FIGS. 13, 14, 15, and/or 16 may be implemented using coded instructions (e.g., computer-readable instructions) stored on a non-transitory computer-readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer-readable medium is expressly defined to include any type of computer-readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 13 is a flowchart representative of example machine-readable instructions 1300 which may be executed to implement the example meter of FIG. 1 to identify media presentation events and/or identify presented media. The machine-readable instructions 1300 of FIG. 13 begin execution at block 1305 when the media identifier 154 determines if a media event is detected (block 1305). The media event is detected when the media identifier 154 detects one or more aspects of media (e.g., audio) being presented by a media presentation device. Any method of identifying a media presentation event such as, for example, monitoring for infrared commands to a media presentation device from a remote control, listening for audio, receiving an indication of a media presentation event from the media presentation device via an Application Programming Interface (API), etc. may be employed.

If a media presentation event is not detected, the media identifier 154 continues to attempt to identify a media presentation event (block 1305). If a media presentation event is detected, the media identifier 154 stores an indication of the media presentation event in the metering data store 158 (block 1310). In the illustrated example, the media identifier 154 stores a panelist identifier, an identifier of the event (e.g., a media start event, a media stop event), and an identified media presentation device. The timestamper 156 stores a timestamp of the media presentation event (block 1315).

The media identifier 154 determines whether the recorded media presentation event indicates that the media presentation event was a media start event (block 1317). If the media presentation event was not a media start event, control returns to block 1305 where the media identifier continues to determine if a media event is detected (block 1305). If the media presentation event was a media start event, the media presenter 154 attempts to identify the presented media (block 1320). In the illustrated example, the media presenter attempts to identify the presented media by detecting codes and/or signatures associated with the presented media. However any other method of identifying the presented media may additionally or alternatively be used such as, for example, by detecting an identifier of the media through an API of the media presentation device, etc.

If the presented media is not identified by the media identifier 154 (block 1325), control proceeds to block 1305 where the media identifier 154 continues to determine if a media event is detected. If the presented media is identified by the media identifier 154 (block 1325), the media identifier stores an indication of the identified media (block 1330). The timestamper 156 stores a timestamp in association with the identified media (block 1335). The media identifier then determines if a media event is detected (block 1305).

Figure 14:
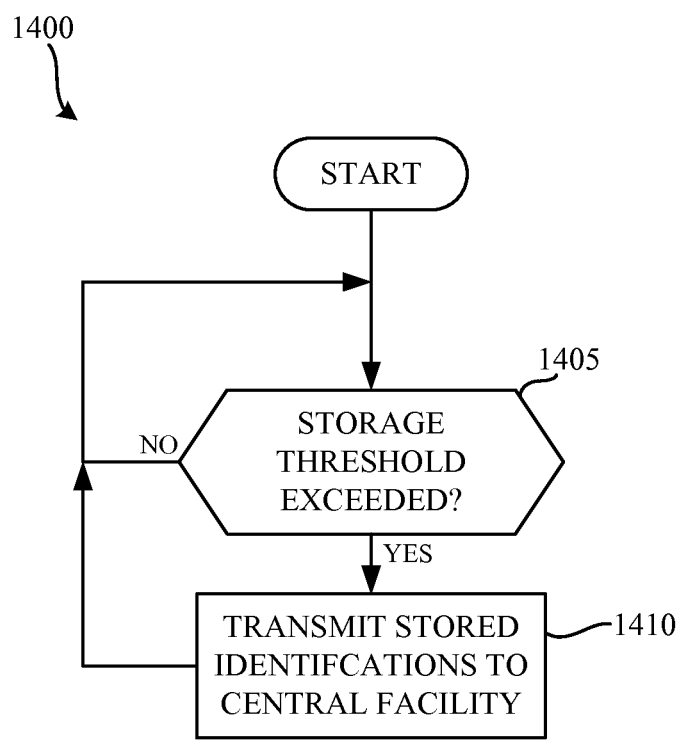
FIG. 14 is a flowchart representative of example machine-readable instructions which may be executed to implement the example meter of FIG. 1.
Figure 15:
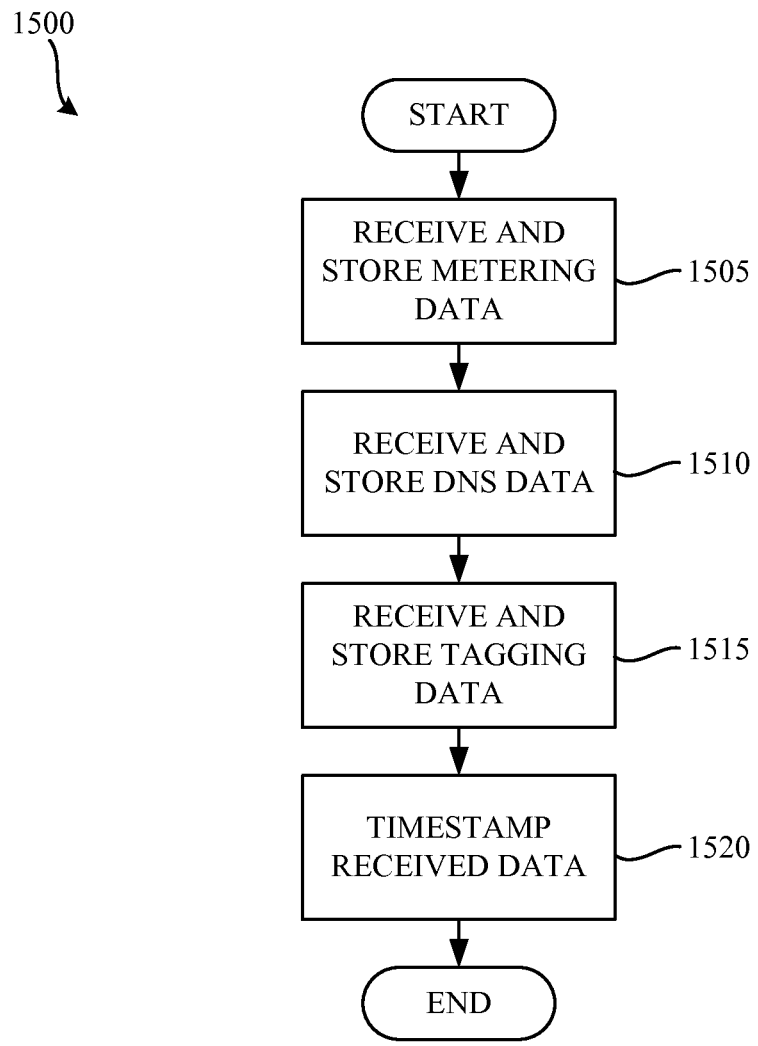
FIG. 15 is a flowchart representative of example machine-readable instructions which may be executed to implement the example central facility of FIGS. 1 and/or 2 to receive audience measurement data.

FIG. 14 is a flowchart representative of example machine-readable instructions 1400 which may be executed to implement the example meter of FIG. 1 to transmit records stored by the meter 150 (e.g. the records of FIG. 7) to the example central facility 170 of FIGS. 1 and/or 2. The machine-readable instructions 1400 of FIG. 14 begin execution at block 1405 when the network communicator 152 determines whether a storage threshold has been exceeded (block 1405). In the illustrated example, the threshold is a time limit specifying that stored records are transmitted once every day. Additionally or alternatively, any other periodic and/or aperiodic approach to triggering transmission of data from the meter 150 may be used. For example, the storage threshold might be based on an amount of records of identified media stored in the metering data store 158 (e.g., ten megabytes of records, one hundred records, etc.).

If the storage threshold has not been exceeded (block 1405) the network communicator 152 waits until the storage threshold has been exceeded. When the storage threshold has been exceeded (block 1405), the network communicator 152 transmits the stored records (e.g., data that can be used to identify the media and/or the name(s) of the identified media, etc.) to the central facility 170. In the illustrated example, the network communicator 152 transmits the stored records via the Internet. However, in some examples, the network communicator 152 transmits the stored records via a cellular telecommunication connection, via the plain old telephone system (POTS), or via a local connection such as, for example, a serial connection, a universal serial bus (USB) connection, a Bluetooth connection, etc. In some examples, the meter 150 may be physically moved to a location of the central facility 170 by, for example, physically mailing the meter 150, physically mailing a removable memory of the meter 150 (e.g., the metering data store 158), etc. to facilitate data extraction from the same.

FIG. 15 is a flowchart representative of example machine-readable instructions which may be executed to implement the example central facility of FIGS. 1 and/or 2 to receive audience measurement data. The machine-readable instructions 1500 of FIG. 15 begin execution at block 1505 when the metering data receiver 220 receives and stores the metering data in the metering data store 225 (block 1505). In the illustrated example, the metering data receiver 220 receives the metering data via the Internet. However, in some examples, the metering data store 225 receives the metering data via a cellular telecommunication connection, via the plain old telephone system (POTS), or via a local connection such as, for example, a serial connection, a universal serial bus (USB) connection, a Bluetooth connection, etc.

The query processors 230, 232 receive and store the DNS data in the DNS data store 235 (block 1510). In the illustrated example, the DNS data is received by the query processors 230, 232 as the DNS queries of the media presentation devices 125, 130 are made (e.g., streamed). However, in some examples, the DNS data may be stored (e.g., cached, buffered, etc.) at a location other than the central facility 170 such as, for example, at a third party DNS provider, at the media presentation devices 125, 130, etc. and may be periodically and/or aperiodically transferred to the central facility 170.

The tag data receiver 240 receives and stores the tagging data in the tagging data store 245 (block 1515). The tagging data identifies the presented media based on tag(s) embedded in and/or associated with presented media. The media presentation devices 125, 130 and/or applications associated with the media presentation devices 125, 130 report the tagging data to the tag data receiver 240. In the illustrated example, the tagging data is received by the tag data receiver 240 as the media presentation devices 125, 130 transmit the tagging data (e.g., streamed). However, in some examples, the tagging data may be stored (e.g., cached, buffered, etc.) by the media presentation devices 125, 130 and may be transmitted periodically and/or aperiodically to the tag data receiver 240.

The timestamper 250 inspects the received data (e.g., the metering data, the DNS data, the tagging data, etc.) and applies timestamps to the received data (block 1520). Among other things, timestamping (e.g., recording a time and/or date that an event occurred) facilitates accurate identification of media at the central facility 170 by, for instance, reducing a search space for matching a reference database of codes and/or signatures. When the received data is streamed, timestamping at the central facility 170 alleviates the meter 150 and/or the media presentation devices 125, 130 from having to timestamp the metering data and/or tagging data.

Figure 16:
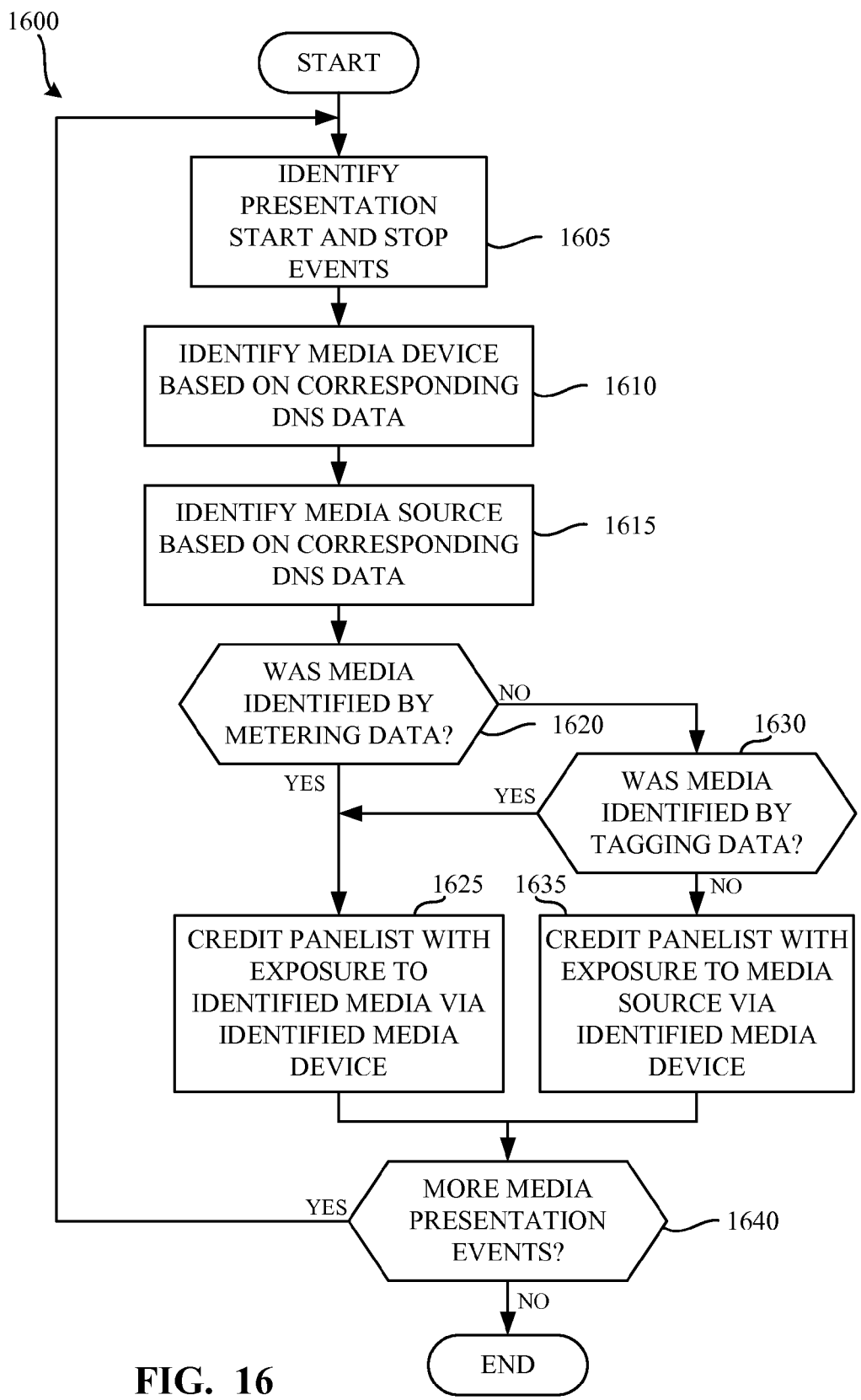
FIG. 16 is a flowchart representative of example machine-readable instructions which may be executed to implement the example central facility of FIGS. 1 and/or 2 to correlate the received audience measurement data of FIG. 15.

FIG. 16 is a flowchart representative of example machine-readable instructions which may be executed to implement the example central facility of FIGS. 1 and/or 2 to correlate the received audience measurement data of FIG. 15. The machine-readable instructions 1600 of FIG. 16 begin execution at block 1605 when the correlator 255 identifies media presentation start and stop events (block 1605). The correlator 255 identifies media presentation start and stop events that occurred on the same media presentation device 125, 130 as indicated by the metering data. Identifying media presentation events associated with the same device enables the correlator 255 to isolate a timeframe of when the media might have been identified by tagging data, when the media might have been identified by metering data, and/or when the media provider might have been identified by DNS data. The correlator 255 identifies the media presentation device 125, 130 based on the corresponding DNS data (block 1610).

To identify the media presentation device 125, 130 via the DNS data, the correlator 225 identifies DNS requests made by the media presentation device 125, 130 associated with the panelist between timestamps of the start and stop media presentation events. In some examples, the correlator 255 identifies DNS requests that were made by the media presentation device 125, 130 outside of the presentation window (e.g., one minute, two minutes, fifteen minutes, one hour, etc.) as, for example, the media presentation device 125, 130 may have requested a DNS record of the media provider 105 prior to the presentation of the media. In some examples, the correlator 255 may identify a DNS record within an approximate timeframe of the media presentation start event (e.g., within one minute of the media presentation start event, within two minutes of the media presentation start event, within fifteen minutes of the media presentation start event, within one hour of the media presentation start event, etc.). The correlator 255 identifies the media source based on the DNS data (block 1615). The correlator 255 identifies the media source based on the DNS data by performing a look of the domain name that was requested by the media presentation device 125, 130.

The audience measurement processor 260 determines if the presented media was identified by the metering data (block 1620). If the media was identified by the metering data (block 1620), the audience measurement processor 260 credits the panelist with exposure to the identified media from the identified source (e.g., the media provider 105) via the identified media presentation device 125, 130 (block 1625). If the media was not identified by the metering data (block 1620), the audience measurement processor 260 determines if the presented media was identified by the tagging data (block 1630). If the media was identified by the tagging data, the audience measurement processor 260 credits the panelist with exposure to the identified media from the identified source (e.g., the media provider 105) via the identified media presentation device 125, 130 (block 1625). If the media was not identified by the tagging data (e.g., identified by neither the tagging data nor the metering data), the audience measurement processor 260 credits the panelist with exposure to media from the identified source (e.g., the media provider 105) via the identified media presentation device 125, 130 (block 1625). In some examples, the panelist is credited with a duration of exposure based on the media presentation start and stop events.

The correlator 255 then identifies whether additional media presentation events are to be identified (block 1640). If additional media presentation events are to be identified, control proceeds to block 1605 where the correlator 255 identifies the additional media presentation events (block 1605). If no additional media presentation events are to be identified the example instructions of FIG. 16 terminate.

Figure 17:
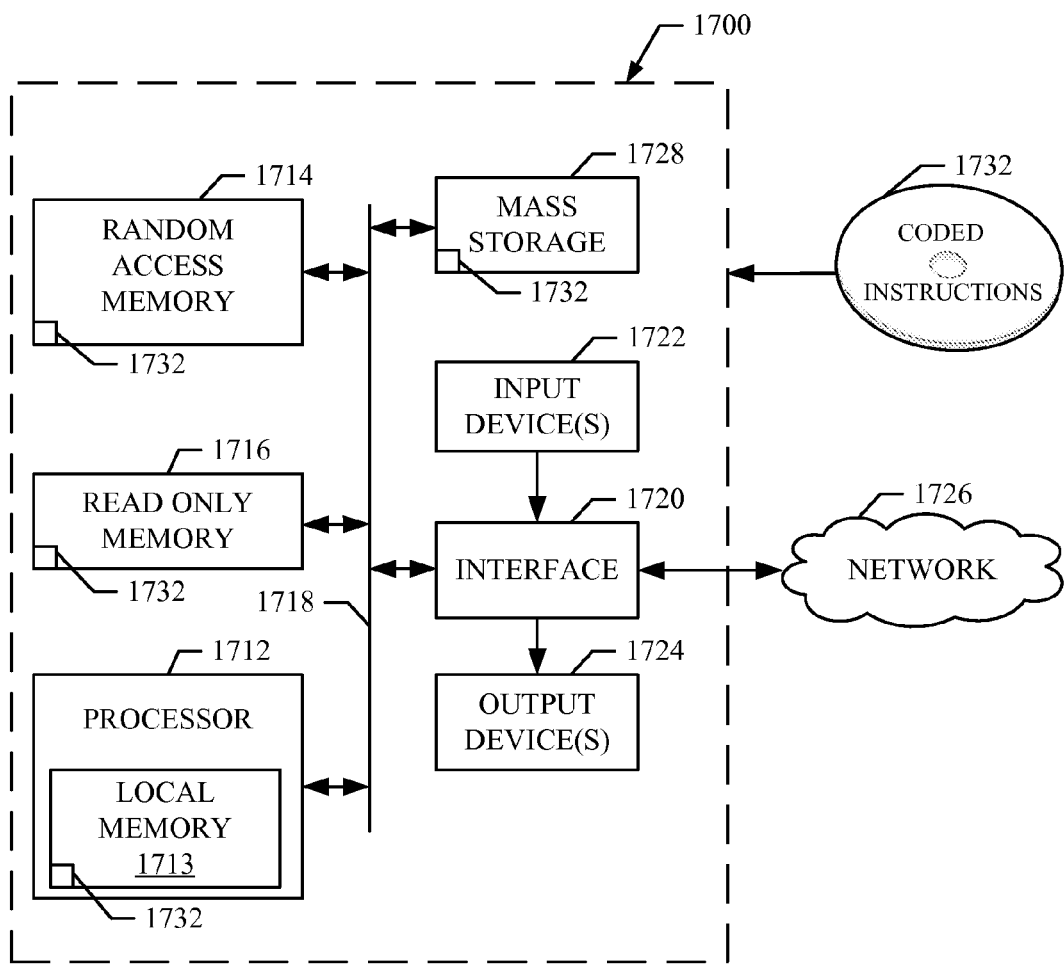
FIG. 17 is a block diagram of an example processor platform capable of executing the example machine-readable instructions of FIGS. 13, 14, 15, and/or 16 to implement the example system of FIG. 1, the example meter of FIG. 1, and/or the example central facility of FIGS. 1 and/or 2.

FIG. 17 is a block diagram of an example processor platform 1700 capable of executing the example machine-readable instructions of FIGS. 13, 14, 15, and/or 16 to implement the example system of FIG. 1 and/or the example central facility of FIGS. 1 and/or 2. The processor platform 1700 can be, for example, a server, a personal computer, a mobile phone (e.g., a cell phone), a personal digital assistant (PDA), an Internet appliance, a DVD player, a digital video recorder, a Blu-ray player, a gaming console, a personal video recorder, a set top box, or any other type of computing device.

The system 1700 of the instant example includes a processor 1712. For example, the processor 1712 can be implemented by one or more microprocessors or controllers from any desired family or manufacturer.

The processor 1712 includes a local memory 1713 (e.g., a cache) and is in communication with a main memory including a volatile memory 1714 and a non-volatile memory 1716 via a bus 1718. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1716 may be implemented by flash memory and/or any other desired type of memory device. Access to the main memory 1714, and/or 1716 is controlled by a memory controller.

The processor platform 1700 also includes an interface circuit 1720. The interface circuit 1720 may be implemented by any type of interface standard, such as an Ethernet interface, a universal serial bus (USB), and/or a PCI express interface.

One or more input devices 1722 are connected to the interface circuit 1720. The input device(s) 1722 permit a user to enter data and commands into the processor 1712. The input device(s) can be implemented by, for example, a keyboard, a mouse, a touchscreen, a track-pad, a trackball, isopoint and/or a voice recognition system.

One or more output devices 1724 are also connected to the interface circuit 1720. The output devices 1724 can be implemented, for example, by display devices (e.g., a liquid crystal display, a cathode ray tube display (CRT), a printer and/or speakers). The interface circuit 1720, thus, typically includes a graphics driver card.

The interface circuit 1720 also includes a communication device (e.g., the network communicator 152) such as a modem or network interface card to facilitate exchange of data with external computers via a network 1726 (e.g., an Ethernet connection, a digital subscriber line (DSL), a telephone line, coaxial cable, a cellular telephone system, etc.).

The processor platform 1700 also includes one or more mass storage devices 1728 for storing software and data. Examples of such mass storage devices 1728 include floppy disk drives, hard drive disks, compact disk drives and digital versatile disk (DVD) drives. The mass storage device 1728 may implement the example metering data store 158, the example panelist information data store 215, the example metering data store 225, the example DNS data store 235, and/or the example tagging data store 245.

The coded instructions 1732 of FIGS. 13, 14, 15, and/or 16 may be stored in the mass storage device 1728, in the volatile memory 1714, in the non-volatile memory 1716, and/or on a removable storage medium such as a CD or DVD.

From the foregoing, it will appreciate that example methods, apparatus and/or articles of manufacture disclosed herein enable correlation of audience measurement data from multiple sources for accurate monitoring of media presentations.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to credit a media exposure, the method comprising:
   identifying a household of panelists based on a public Internet Protocol address identified in tagging data transmitted by a media presentation device;
   identifying a panelist within the household of panelists based on metering data;
   identifying a media source based on the tagging data;
   attempting to identify media presented in association with the tagging data based on at least one of the tagging data and the metering data;
   crediting, with a processor, the panelist with exposure to identified media from the media source at a media presentation location associated with the public IP address when the media is identified; and
   crediting, with the processor, the panelist with exposure to media from the media source at the media presentation location when the media is not identified.

2. The method as described in claim 1, further including:
   identifying a media presentation start event and a media presentation stop event based on the metering data wherein the crediting of the panelist includes storing a duration of time between the media presentation start event and the media presentation stop event.

3. The method as described in claim 1, wherein the metering data includes an identifier of the presented media.

4. The method as described in claim 3, wherein the identifier includes at least one of a code, a signature, or metadata of the identified media.

5. The method as described in claim 3, wherein the metering data does not enable identification of the media source.

6. The method as described in claim 3, further including receiving the metering data from a meter installed at the media presentation location.

7. The method as described in claim 1, further including:
   identifying the media presentation device as a first media presentation device in a set of media presentation devices at the household based on an identifier within the tagging data wherein the crediting of the panelist includes storing an identification of the first media presentation device.

8. The method as described in claim 1, wherein the tagging data includes metadata associated with the media.

9. An apparatus comprising:
   a tag data receiver to receive tagging data from a media presentation device, the tagging data to identify a public Internet Protocol address of the media presentation device, the tagging data receiver to identify a panelist household based on the public Internet protocol address, the tagging data to identify a media source;
   a metering data receiver to receive metering data from a meter in proximity to the media presentation device,
   a correlator to correlate the tagging data with the metering data to attempt to identify media presented by the media presentation device; and
   an audience measurement processor to (1) credit a panelist of the panelist household with exposure to identified media from the media source when the media is identified by the correlator, and (2) credit the panelist of the panelist household with exposure to media from the media source when the media is not identified by the correlator.

10. The apparatus as described in claim 9, further including a timestamper to timestamp at least one of the metering data and the tagging data.

11. The apparatus as described in claim 9, further including a registrar to associate a record of the public Internet Protocol address with the panelist household.

12. The apparatus as described in claim 9, wherein the audience measurement processor is further to store a record crediting the media presentation device with having presented media from the media source.

13. The apparatus as described in claim 9, further including a reporter to generate a report indicative of media exposure metrics based on the credit of the exposure.

14. A machine-readable storage medium comprising instructions which, when executed, cause a machine to at least:
- identify a household of panelists based on a public Internet Protocol address identified in tagging data transmitted by a media presentation device;
- identify a panelist within the household of panelists based on metering data;
- identify a media source based on the tagging data;
- attempt to identify the media presented in association with the tagging data based on at least one of the tagging data and the metering data;
- credit the panelist with exposure to identified media from the media source at a media presentation location associated with the public IP address when the media is identified; and
- credit the panelist with exposure to media from the media source at the media presentation location when the media is not identified.

15. The machine-readable storage medium as described in claim 14, wherein the instructions, when executed, cause the machine to at least identify a media presentation start event and a media presentation stop event based on the metering data, wherein the instructions cause the machine to credit the panelist by storing a duration of time between the media presentation start event and the media presentation stop event.

16. The machine-readable storage medium as described in claim 14, wherein the metering data includes an identifier of the presented media.

17. The machine-readable storage medium as described in claim 16, wherein the identifier includes at least one of a code, a signature, or metadata of the identified media.

18. The machine-readable storage medium as described in claim 16, wherein the metering data does not enable identification of the media source.

19. The machine-readable storage medium as described in claim 16, wherein the instructions, when executed, cause the machine to receive the metering data from a meter located at the media presentation location.

20. The machine-readable storage medium as described in claim 14, wherein the instructions, when executed, cause the machine to at least:
- identify the media presentation device as a first media presentation device in a set of media presentation devices at the household based on an identifier within the tagging data,
- wherein the instructions cause the machine to credit the panelist by storing an identification of the first media presentation device.

* * * * *